(12) United States Patent
Kimura

(10) Patent No.: US 6,950,557 B2
(45) Date of Patent: Sep. 27, 2005

(54) IMAGE ENCODING APPARATUS AND IMAGE DECODING APPARATUS

(75) Inventor: Shunichi Kimura, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 749 days.

(21) Appl. No.: 09/799,353

(22) Filed: Mar. 6, 2001

(65) Prior Publication Data

US 2001/0028749 A1 Oct. 11, 2001

(30) Foreign Application Priority Data

Mar. 15, 2000 (JP) ........................ 2000-071598

(51) Int. Cl.[7] ................ G06K 9/36; G06K 15/00
(52) U.S. Cl. ............... 382/239; 382/251; 358/1.2; 358/3.26
(58) Field of Search ................ 382/240, 238, 382/239, 232, 299, 251, 234, 233, 252, 176, 243; 358/1.2, 3.26, 426.01, 1.6, 3.17

(56) References Cited

U.S. PATENT DOCUMENTS

| | | | | |
|---|---|---|---|---|
| 5,621,543 A | * | 4/1997 | Oomoto | 382/243 |
| 5,742,703 A | * | 4/1998 | Lin et al. | 382/176 |
| 6,009,201 A | * | 12/1999 | Acharya | 382/232 |
| 6,181,826 B1 | * | 1/2001 | Weldy et al. | 382/240 |
| 6,342,950 B1 | * | 1/2002 | Tabata et al. | 358/1.6 |
| 6,559,972 B1 | * | 5/2003 | Takahashi et al. | 358/1.2 |

FOREIGN PATENT DOCUMENTS

| | | | | |
|---|---|---|---|---|
| JP | 6-40661 | 5/1994 | .......... | H04N/1/413 |
| JP | 8-317220 | 11/1996 | ............ | H04N/1/41 |

OTHER PUBLICATIONS

Peter G. J. Barten, "Evaluation of Subjective Image Quality With the Square–Root Integral Method", Opt. Soc. Am. A/vol. 7, No. 10/Oct. 1990, pp. 2024–2031.

"International Standard of Multi–Media Coding" edited by H. Yasuda, Maruzen Co., Ltd., 1991, pp. 16–47.

Saito et al., "Optimal Quantization for DCT Coefficients in Variable Length Coding Considering the Human Perception", Technical Report of IEICE, IE 90–101, 1990, pp. 39–46.

"New Edition, Sensation/Perception Psychology Handbook", edited by Oyama et al., Seishin Shobo, 1994, pp. 557–558.

* cited by examiner

*Primary Examiner*—Wenpeng Chen
(74) *Attorney, Agent, or Firm*—Morgan, Lewis & Bockius LLP

(57) ABSTRACT

The perceptible resolution and the number of gradations are both guaranteed, and an image is encoded at a high efficiency. An apparatus of the present invention is provided with a blocking circuit for dividing an input image into blocks, a quantization LUT for quantizing the image in a block, a quantization representative value LUT for obtaining a quantization representative value of the quantized image, a differential calculation circuit for obtaining the average value in the block of the differential between the pixel value in the block and the quantization representative value obtained by the quantization representative value LUT, an average value obtaining unit having an adding circuit and a dividing circuit, a first hierarchy encoder for encoding the image quantized by the quantization LUT, and a second hierarchy encoder for encoding the average value obtained by the average value obtaining unit.

15 Claims, 22 Drawing Sheets

200dpi PIXEL
600dpi PIXEL

| INPUT VALUE | OUTPUT VALUE (QUANTIZATION INDEX) |
|---|---|
| 0 | 0 |
| 1~18 | 1 |
| 19~36 | 2 |
| 37~54 | 3 |
| 55~72 | 4 |
| 73~90 | 5 |
| 91~108 | 6 |
| 109~127 | 7 |
| 128~146 | 8 |
| 147~164 | 9 |
| 165~182 | 10 |
| 183~200 | 11 |
| 201~219 | 12 |
| 220~238 | 13 |
| 239~254 | 14 |
| 255 | 15 |

FIG.17

| INPUT VALUE | OUTPUT VALUE (QUANTIZATION REPRESENTATIVE VALUE) |
|---|---|
| 0 | 0 |
| 1~18 | 10 |
| 19~36 | 28 |
| 37~54 | 46 |
| 55~72 | 64 |
| 73~90 | 82 |
| 91~108 | 100 |
| 109~127 | 118 |
| 128~146 | 137 |
| 147~164 | 156 |
| 165~182 | 174 |
| 183~200 | 192 |
| 201~218 | 210 |
| 219~238 | 229 |
| 239~254 | 247 |
| 255 | 255 |

FIG.18

| INPUT VALUE | OUTPUT VALUE (INVERSE QUANTIZATION VALUE) |
|---|---|
| 0 | 0 |
| 1 | 10 |
| 2 | 28 |
| 3 | 46 |
| 4 | 64 |
| 5 | 82 |
| 6 | 100 |
| 7 | 118 |
| 8 | 137 |
| 9 | 156 |
| 10 | 174 |
| 11 | 192 |
| 12 | 210 |
| 13 | 229 |
| 14 | 247 |
| 15 | 255 |

FIG.19

| INPUT VALUE | POSITIVE SIDE PERMISSION RANGE | NEGATIVE SIDE PERMISSION RANGE |
|---|---|---|
| 0 | 0 | 0 |
| 1 | 9 | 9 |
| 2 | 9 | 9 |
| 3 | 9 | 9 |
| 4 | 9 | 9 |
| 5 | 9 | 9 |
| 6 | 9 | 9 |
| 7 | 9 | 9 |
| 8 | 9 | 9 |
| 9 | 9 | 9 |
| 10 | 9 | 9 |
| 11 | 9 | 9 |
| 12 | 9 | 9 |
| 13 | 9 | 9 |
| 14 | 9 | 9 |
| 15 | 0 | 0 |

FIG.20

| 6 | 4 | 7 |
|---|---|---|
| 2 | 1 | 3 |
| 8 | 5 | 9 |

FIG.24
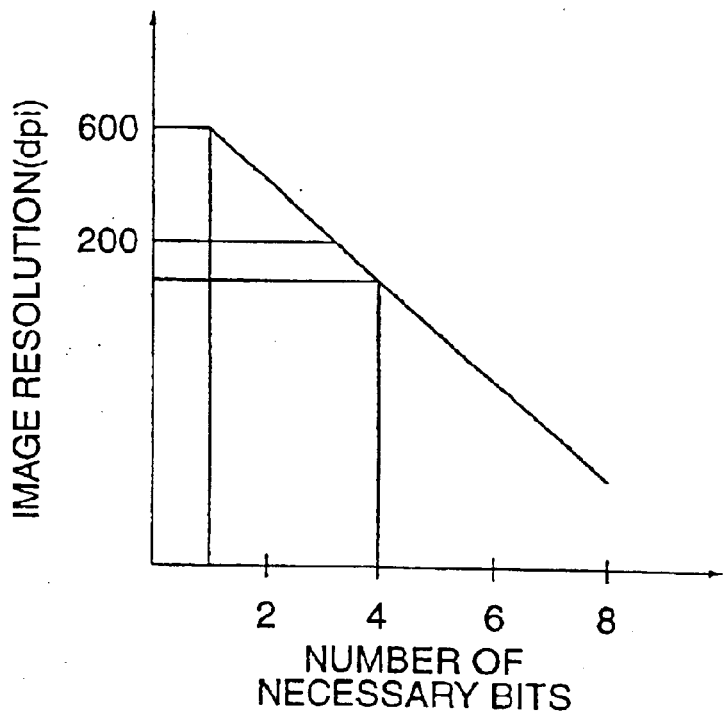
Related Art  FIG.25
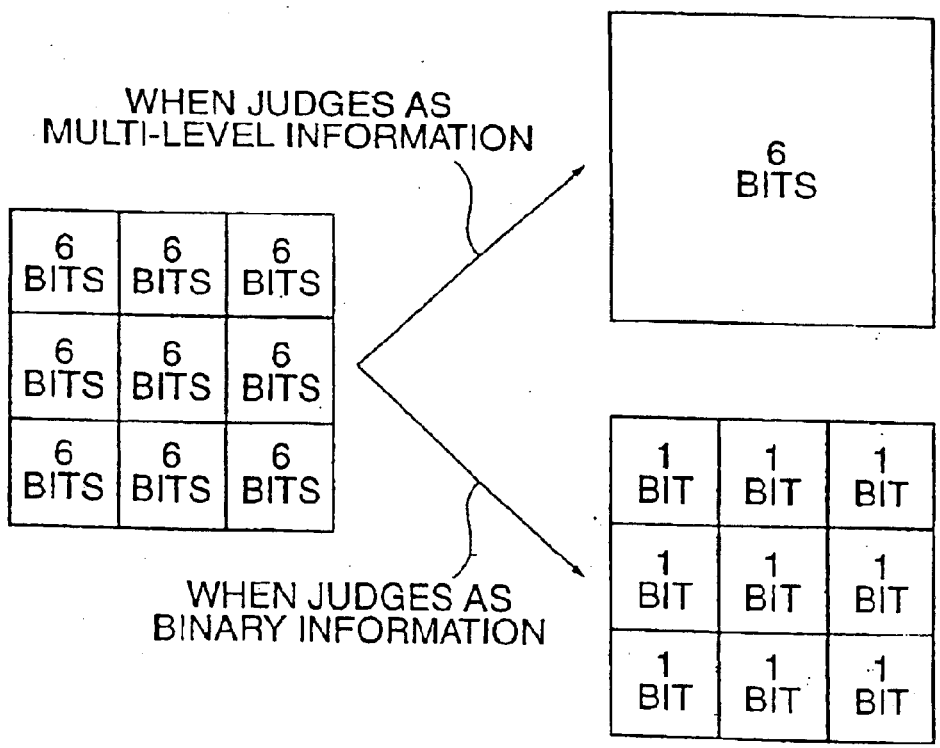

Related Art  *FIG.26*
| LEVEL | MULTI-LEVEL | NUMBER OF BINARY BLACK PIXELS |
|---|---|---|
| 0 | 0 | 0 |
| 1 | 1 | |
| 2 | 2 | |
| ... | ... | ... |
| 10 | 10 | |
| 11 | 11 | 4 |
| 12 | | 1 |
| 13 | | 2 |
| 14 | | 3 |
Related Art  *FIG.27*
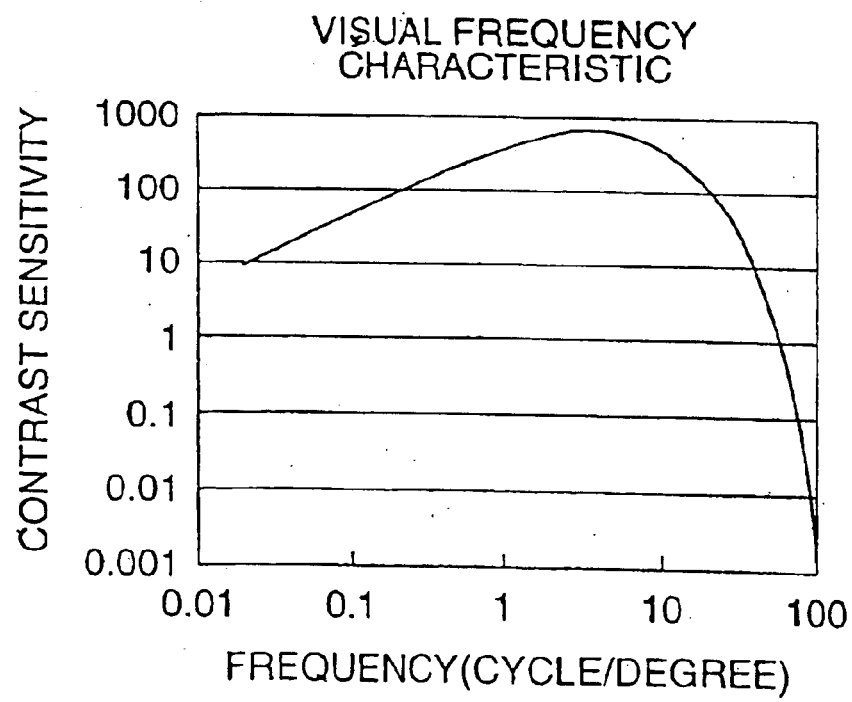

PICTURE PORTION

CHARACTER LINE DRAWING PORTION

IMAGE ENCODING APPARATUS AND IMAGE DECODING APPARATUS

BACKGROUND OF THE INVENTION

1. Field of the Invention

This invention relates to an image encoding apparatus for compressing the image data to reduce the data quantity.

2. Description of the Related Art

The larger number of gradation and higher resolution are required to obtain the higher quality digital image. The capacity of an image is represented by "number of pixel× number of gradation bits" and is very huge. To reduce the image storage cost, or to reduce the image transmission time, the image compression has been employed.

Heretofore, the image compression method that utilizes the human visual characteristic has been employed. As the visual characteristic, a reference 1 (Peter G. J. Barten, "Evaluation of subjective image quality with the square-root integral method", J. Opt. Soc. Am. A/Vol. 7, No. 10/October 1990, pp. 2024–2031) is exemplified.

In this reference, an approximate expression of the visual frequency characteristic is shown. FIG. 27 is a graph that represents the approximate expression described in the reference. The axis of abscissa of this graph represents the cycle for every degree angle of visibility and the axis of ordinate represents the contrast sensitivity. According to the graph, the contrast sensitivity decreases in the high frequency region. In other words, the perception is poor in the high frequency region even though the number of gradation is reduced. A compression method that utilizes this nature has been employed heretofore.

Examples of the compression method that utilizes the visual characteristic is shown hereunder. Two categories are described hereunder. In the first category, the compression is realized by reducing the number of pixels of the image or by reducing the number of gradations directly (conventional example 1-1 and conventional example 1-2). In the second category, the compression is implemented by a method in which the input image is subjected to orthogonal transformation and quantization of the transformation coefficient is matched with the visual characteristic (conventional example 2).

At first, the first category example will be described. Because the capacity of an image is represented by (number of pixels×number of gradation bits)the image compression is realized by reducing the number of pixels or by reducing the number of gradation bits. In the region of characters or line drawing in the image, the large number of gradation is not necessary because high frequency component is predominant in the region. It is possible to compress the image by reducing the number of gradation bits in such a region.

In the case where the frequency component of the input image is low, the number of gradations cannot be reduced. However, because the frequency band of the image is small, it is possible to compress the image without aliasing. In detail, because there are some portions where the high frequency component is not predominant on the natural image portion such as a photograph on the image, it is possible to compress the image by reducing the number of pixels on such a region.

In summary, the low frequency region can be compressed by reducing the number of pixels. On the other hand, the high frequency region can be compressed by reducing the number of gradations.

Japanese Published Examined Patent Application No. Hei 6-40661 is exemplified as an example of compression method described hereinabove. Japanese Published Examined Patent Application No. Hei 6-40661 is referred to as the conventional example 1-1 hereinafter. In the conventional example 1-1, an input image having 6 bits per pixel is divided into 3×3 pixel blocks. Next, whether this pixel block is to be binary-encoded or multi-level encoded is checked.

As shown in FIG. 25, the average value of 9 pixels in 3×3 block is calculated in the case of multi-level encoding to be 1-pixel information having 6 bits. On the other hand, 9 pixels in 3×3 block are binarized respectively to form 9 pixel information having 1 bit in the case of binary encoding. 3×3 block information is converted to 1-pixel information having 6 bits or 9-pixel information having 1 bit. 1-bit information for indicating whether it is a multi-level block or binary block is added to every block in encoding. In summary, 1 block of 3×3 pixel is encoded into 10 bits at worst.

Japanese Published Unexamined Patent Application No. Hei 8-317220 is exemplified as another example. Japanese Published Unexamined Patent Application No. Hei 8-317220 is referred to as the conventional example 1-2 hereinafter. In the conventional example 1-2, for example, an input image is divided into 2×2 pixel blocks. Next, whether this pixel block is to be binary-encoded or multi-level encoded is checked. In the case of multi-level encoding, the average value of 4 pixels in 2×2 block is encoded. On the other hand, in the case of binary encoding, the number of black pixels in 2×2 pixel block is encoded.

As an example, in the case of multi-level encoding, the number of average levels is quantized into 12 levels ranging from 0 to 11. On the other hand, in the case of binary encoding, the number of black pixels is any one of 0, 1, 2, 3, or 4. When the number of black pixels is 0, the same state as that of the multi-level 0 is represented. When the number of black pixels is 4, the same state as that of the multi-level 11 is represented. Accordingly, as shown in FIG. 26, it is possible to encode at 15 levels in the total cases of multi-level encoding and binary encoding.

The conventional example 1-2 is different from the conventional example 1-1 in that the multi-level encoding and binary encoding are involved in the same encoding space and the multi-level/binary determination bit is thereby unnecessary. However, the conventional example 1-2 is similar to the conventional example 1-1 in that it is necessary to check to see for every block whether multi-level encoding is to be employed or binary encoding is to be employed for encoding.

As described hereinabove, in the conventional example 1-1 and the conventional example 1-2, whether an input image block is the low frequency information that requires the number of gradations or the high frequency information that does not require the number of gradations is checked. Next, in the case of the low frequency information that requires the number of gradations, the average value of the pixel value in the block is encoded. On the other hand, in the case of the high frequency information that does not require the number of gradations, the number of gradation of the pixel value in the block is reduced (in the abovementioned example, the number of gradations is binary) to thereby increase the compression rate.

Next, the second compression method example that utilizes the visual characteristic (conventional example 2) will be described. Currently, still image encoding international standard JPEG (ITU-T recommendation T-81) system has been most widely used as the still image encoding system.

"International Standard of Multi-Media Coding" (edited by H. Yasuda, Maruzen Co., Ltd., 1991, pp. 16–47) is exemplified as a reference for describing the outline of JPEG system. JPEG system is referred to as the conventional example 2 hereinafter.

In JPEG system, an input image is divided into 8×8 pixel blocks, and each block is subjected to DCT (discrete cosine transformation) to obtain 8×8 DCT coefficients. Furthermore, 8×8 DCT coefficients are quantized for compression. 8×8 quantized step widths (quantization table) are not specified in the standard, and can be set without restriction. Therefore, the quantization table may be designed with consideration of the visual characteristic to thereby implement encoding with a higher compression rate.

For example, a reference (Saito et. al. "Optimal Quantization for DCT Coefficients in Variable Length Coding Considering the Human Perception" Technical Report of IEICE, IE 90-101, 1990, pp. 39–46) is exemplified as an exemplary design of the quantization table. This reference describes a method for designing a quantization table with consideration of the visual characteristic in the encoding system in which DCT (discrete cosine transformation) is used.

Because DCT is used in JPEG system, the system described in this reference can be used when a quantization table according to JPEG system is designed. Each quantization step width (quantization table) of 8×8 DCT coefficients is designed so that the visual strain is minimized for the given code quantity with consideration of the visual characteristic. The visual characteristic to be addressed is the visual frequency characteristic that is similar to that shown in the reference 1.

Herein, the visual frequency characteristic is calculated under the assumption $H(f)=2.46 (0.1+0.25 f) \exp(-0.25 f)$. Wherein, f in the abovementioned equation denotes the number of cycles per unit angle of visibility (cycle/degree).

However, the abovementioned examples are involved in the problem as described hereunder.

(Problem 1) the case where the portion that requires the resolution and the portion that requires the number of gradations are mixed in a block cannot be processed.

(Problem 2) the case where the gradation level represents the edge position results in the image strain.

The problem 1 and the problem 2 will be described in detail hereinafter. At first, the problem 1 will be described. A block having a character or line drawing that is overwritten on a picture background as shown in FIG. 28 is addressed. The picture is the data that requires the number of gradations and the character or line drawing is the data that requires the resolution. In the case of the block as described hereinabove, if the block is determined as the multi-level information and the average value of the block is encoded, then the resolution information of the character line drawing is lost.

On the other hand, if the block is determined as the binary (or a small number) block and the pixel value in the block is quantized, then the number of gradations of the picture is lost. To avoid the loss, the block size of the determination unit should be minimized. At worst, 1 pixel per block is necessary. The small block size results in reduced compression rate. In other words, the conventional example 1-1 and the conventional example 1-2 cannot deal with the case in which the portion that requires the resolution and the portion that requires the number of gradations are mixed in a block.

Next, the problem 2 will be described. Gray font is exemplified as an example in which the gradation level represents the edge position. Usually, an imager that is the software for generating a printing image generates the character line drawing with binary image. In this case, the character cannot be represented with the resolution equal to or higher than the pixel resolution.

An image generated with binary is shown in FIG. 29. A rectangle in FIG. 29 corresponds to one pixel. As shown in FIG. 29, jaggies are caused on the slant line. Otherwise, the line width and the edge position are limited to the integral multiple of the resolution of the pixel. The limitation is the problem. To solve the problem, in the case of the gray font, the character image quality is improved without increase of the pixel resolution by generating the character image with multi-level.

As shown in FIG. 30, the pixel is expressed with multi-level. The pixel expressed with multi-level is complemented with the visual characteristic (or by controlling the marking position correspondingly to the pixel value), and a slant line or a line of the width and position other than the pixel resolution integral multiple can be expressed as shown in the lower diagram of FIG. 30.

As described hereinabove, in the gray font, the pixel value provides the information for controlling the edge position. The gray font is an example that generates artificially the multi-gradation image so that the gradation level represents the edge position. The image as described hereinabove exists in the natural image. The case where a character image is scanned in with multi-level likely provides the same effect as the artificially generated gray font. The case where an input image has an edge likely provides the same effect that the gradation level represents the edge position as in the abovementioned case though the magnitude of the effect on the visual sensation is different each other.

In the case of the image that the number of gradation represents the edge position, if the number of gradation is changed, then the edge position is resultantly shifted, and the shifted position is conceived as the image strain. A reference (edited by Oyama et. al. "New Edition, Sensation/Perception Psychology Handbook" Seishin Shobo, 1994, pp. 557–558) describes the perception threshold value of the edge position that is referred to as vernier acuity. According to this reference, the minimum deviation that is the perceivable deviation between two lines as shown in FIG. 31, namely the threshold value of the vernier acuity, corresponds to 2" angle of visibility. The deviation of the edge position should be suppressed within 2" angle of visibility.

In the case of the conventional example 1-1 and the conventional example 1-2, if the block is determined to be multi-level, then the resolution is changed to the resolution lower than the pixel resolution. At that time, the edge position information higher than the pixel resolution as described hereinabove is lost. If the block is determined to be binary (diminished level)then the pixel is quantized to cause the edge position error. Therefore, the image strain is caused anyway.

In the case of the conventional example 2, because the quantization is performed in the orthogonal transformation region, it is difficult to guarantee the error magnitude of individual pixel values. Though the quantization table designing method with consideration of the visual frequency characteristic has been known, the quantization table designing method that can guarantee the edge position with consideration of the vernier acuity has not been known.

Therefore, the conventional example 2 cannot guarantee the edge position. The conventional example 2 could guarantee the edge position by sufficiently minimizing the quantization step width only when the compression rate is suppressed low.

The present invention has been accomplished to solve the abovementioned problem, and provides an image encoding apparatus that is capable of guaranteeing the edge position specified by perceptible resolution, namely vernier acuity, and also guaranteeing the perceptible number of gradations, and capable of high efficiency encoding, and provides an image decoding apparatus that is capable of decoding the encoded code.

SUMMARY OF THE INVENTION

An image encoding apparatus of the present invention is provided with a blocking unit that divides an input image into blocks, a quantization unit that quantizes the image in a block divided by the blocking unit, a quantization representative obtaining unit that obtains a quantization representative value of the image quantized by the quantization unit, an average value obtaining unit that obtains the average value in the block of the differential between the pixel value in the block and the quantization representative value obtained by the quantization representative value obtaining unit, a first hierarchy encoding unit that encodes the image quantized by the quantization unit, and a second hierarchy encoding unit that encodes the average value obtained by the average value obtaining unit.

The image encoding apparatus as described hereinabove divides the input image into two hierarchies having different resolutions. Herein, the resolution of the first hierarchy is the resolution of the input image, and the resolution of the second hierarchy is the resolution of the block blocked by the blocking unit.

The image data of the first hierarchy is quantized by the quantization unit, and then encoded by the first hierarchy encoding unit. Thereby, the image data is encoded so that the number of gradation is reduced to the perceptible minimum value while the resolution remains unchanged. On the other hand, the image data of the second hierarchy is converted to the average value in the block by the average value obtaining unit, and it is encoded by the second hierarchy encoding unit. Thereby, the image data is encoded so that the resolution is reduced while the number of gradations remains at the level that is sufficient to express the perceptible edge.

An image decoding apparatus of the present invention for decoding a code encoded by the image encoding apparatus described hereinabove is provided with a first hierarchy decoding unit that decodes a code encoded by the first hierarchy encoding unit, a second hierarchy decoding unit that decodes a code encoded by the second hierarchy encoding unit, an inversely quantization unit that inversely quantizes the data decoded by the first hierarchy decoding unit, a pixel value correction unit that corrects the first hierarchy data inversely quantized by the inverse quantization unit by use of the second hierarchy data decoded by the second hierarchy decoding unit to obtain the image data in the block, and an inverse blocking unit that raster-scans the image data in the block obtained by the pixel value correction unit.

According to the present invention, the data decoded by the first hierarchy decoding unit is inversely quantized by the inverse quantization unit because it is a quantization index. The data decoded by the second hierarchy decoding unit is the differential data between the input image data and the first hierarchy image. Therefore, the pixel value correction unit adds the first hierarchy data inversely quantized by the inverse quantization unit to the second hierarchy data (differential data) decoded by the second hierarchy decoding unit to thereby correct the first hierarchy image data, and the image data in the block is obtained.

BRIEF DESCRIPTION OF THE DRAWINGS

Preferred embodiments of the present invention will be described in detail based on the followings, wherein:

FIG. 17 is a table showing an exemplary quantization representative value LUT;

FIG. 18 is a table showing an exemplary inverse quantization LUT;

FIG. 19 is a table showing an exemplary pixel value variation permission range LUT;

FIG. 20 is a diagram showing an exemplary in-block addition order;

FIG. 24 is a conceptual diagram (3) describing the relation between the necessary number of bits and the image resolution;

FIG. 25 is a diagram illustrating a conventional example 1;

FIG. 26 is a table showing a conventional example 2;

FIG. 27 is a graph describing the visual frequency characteristic;

DETAILED DESCRIPTION OF THE PREFERRED EMBODIMENTS

The preferred embodiments of the present invention will be described hereinafter. At first, the overview of the present embodiment will be described. In the present embodiment, the input image data is expressed separately into the first image data (image data of minimized resolution that is capable of expressing the number of all perceptible gradations) and the second image data (image data of minimized number of gradations that is capable of expressing all the perceptible edge positions). Furthermore, in the case where a first image data and a second image data are superimposed one on the other, it is enough to retain either of them.

At first, the first image data (image data of minimized resolution that is capable of expressing the number of all perceptible gradations) will be described. In the visual frequency characteristic diagram shown in FIG. 27, the axis of abscissa represents the frequency (cycle/degree), and the axis of ordinate represents the contrast sensitivity. The contrast sensitivity shows the number of perceptible gradations.

Herein, the number of bits necessary for expressing the number of perceptible gradations N is expressed by the following equation.

$$B = \log_2 N$$

Furthermore, the maximum value of the pixel period T that is capable of representing the frequency W is expressed by the following equation.

$$T = 1/(2W)$$

Assuming that the image resolution per degree of the angle of visibility is f (number of pixels/degree) then f is expressed by the following equation.

$$f = 1/T = 2W$$

The relation between the image resolution f (number of pixels/degree) and the number N of bits necessary to express the number of perceptible gradations N is derived from the visual frequency characteristic graph shown in FIG. 27.

Figure 22:
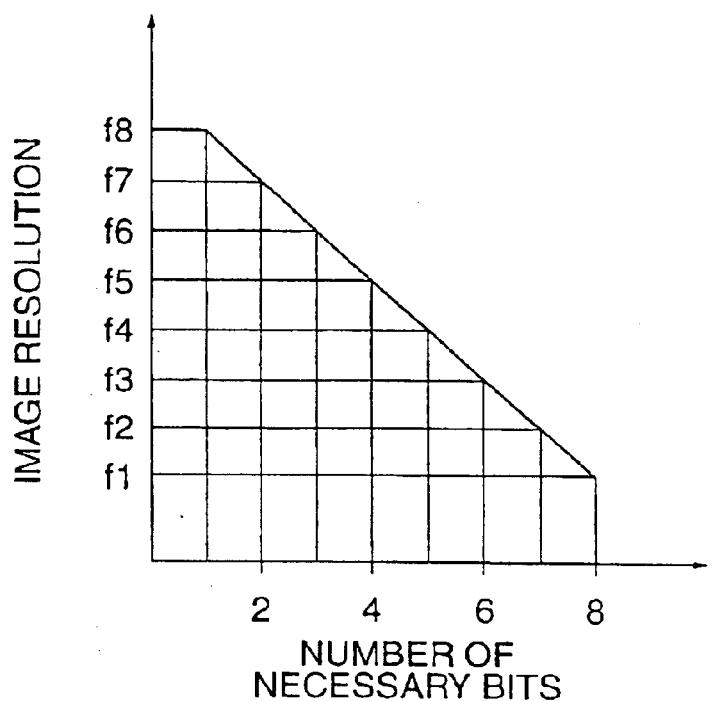
FIG. 22 is a conceptual diagram (1) describing the relation between the necessary number of bits and the image resolution.

The conceptual diagram for showing the relation between f and B is shown in FIG. 22. The portion where the resolution is low is omitted from the graph shown in FIG. 22. The number of necessary bits becomes smaller with rising resolution in the high resolution portion.

It is possible to obtain the image data of minimized resolution that is capable of expressing the number of all perceptible gradations by use of FIG. 22. On the conceptual graph shown in FIG. 22, the relation between the image resolution and the number of necessary bits is described hereunder.

In the case of the image resolution f8, the number of necessary bits of the information may be 1 bit.

In the case of the image resolution f7 to f8, the number of necessary bits of the information may be 2 bits. In the case of the image resolution f6 to f7, the number of necessary bits of the information may be 3 bits.

In the case of the image resolution f5 to f6, the number of necessary bits of the information may be 4 bits.

In the case of the image resolution f4 to f5, the number of necessary bits of the information may be 5 bits.

In the case of the image resolution f3 to f4, the number of necessary bits of the information may be 6 bits.

In the case of the image resolution f2 to f3, the number of necessary bits of the information may be 7 bits.

In the case of the image resolution f1 to f2, the number of necessary bits of the information may be 8 bits.

It becomes possible that the input image is divided into plural images of different resolution and each image is subjected to quantization suitable for the resolution of the image for data compression. Because the abovementioned respective information of resolutions is not independent and includes the common information, the information is included so that the common information is excluded as much as possible, and the image can be compressed the more. Furthermore, because the images of different resolutions are redundant, the image can be compressed the more by applying the conventional image encoding method or conventional data compression method.

Next, the second image data (the image data of minimized number of gradations that is capable of expressing all the perceptible edge positions) will be described. To express all the perceptible edge positions, the edge position error caused when the gradation level of the input image is transformed to the edge position may be included within the threshold value of the vernier acuity.

The edge position error to be the vernier acuity can be transformed to the gradation level. By applying quantization of the input pixel at the gradation level, the data quantity can be reduced while the edge position is guaranteed. To obtain the data of minimized number of gradations that is capable of expressing all the perceptible edge positions, the input pixel is quantized.

Furthermore, in the case where the second image data partially represents the first image data, the relevant part of the first image data is omitted. For example, in the case where the input resolution is f8 and the number of bits after quantization of the second image data is 4, the information having the image data quantity equal to or smaller than 4 bits may be omitted out of the first image data.

In detail, four cases, namely in the case of the image resolution of f8, 1-bit information, in the case of the image resolution of f7 to f8, 2-bit information, in the case of the image resolution of f6 to f7, 3-bit information, and in the case of the image resolution of f5 to f7, 4-bit information, can be omitted because these four cases can be represented by the second image data, namely the 4 bit information having the image resolution of f8.

Therefore, the image can be expressed by use of the following four information without any image strain.

4-bit information having the image resolution of f8, 5-bit information having the image resolution of f4 to f5, 6-bit information having the image resolution of f3 to f4, 7-bit information having the image resolution of f2 to f3, and 8-bit information having the image resolution of f1 to f2.

For example, "5-bit information having the image resolution of f4 to f5" may have the highest resolution of the information. In other words, "5-bit information having the image resolution of f4 to f5" is expressed with "5-bit information having the image resolution of f5".

The information is summarized including other information as described hereunder.

4-bit information having the image resolution of f8.
5-bit information having the image resolution of f5.
6-bit information having the image resolution of f4
7-bit information having the image resolution of f3
8 bit information having the image resolution of f2.

Next, embodiments will be described.

(First Embodiment)

The first embodiment relates to the image encoding apparatus, and also relates to the image decoding apparatus. Furthermore, the image encoding apparatus of the first embodiment block-divides an input image into two images having different resolutions and encodes the respective images.

In the first embodiment, it is assumed that the data width per 1 pixel of the input image is 8 bits and the resolution is 600 dpi (hereinafter the image resolution wherein N pixels are arranged on a 25.4 mm straight line is described as N dpi)the interval between adjacent pixels is approximately 42.3 μm in the case of 600 dpi. Herein, if the visual range is 30 cm, then the distance corresponding to the threshold value 2" of the vernier acuity is 30 sin (2") cm, namely approximately 2.9 μm. Because 42.3/2.9=approximately 15, the pixel value of 600 dpi can be controlled to the value equal to or smaller than the threshold value of the vernier acuity if approximately 15 gradations or more is expressed. Then, 600 dpi is expressed with 4 bits.

Figure 23:
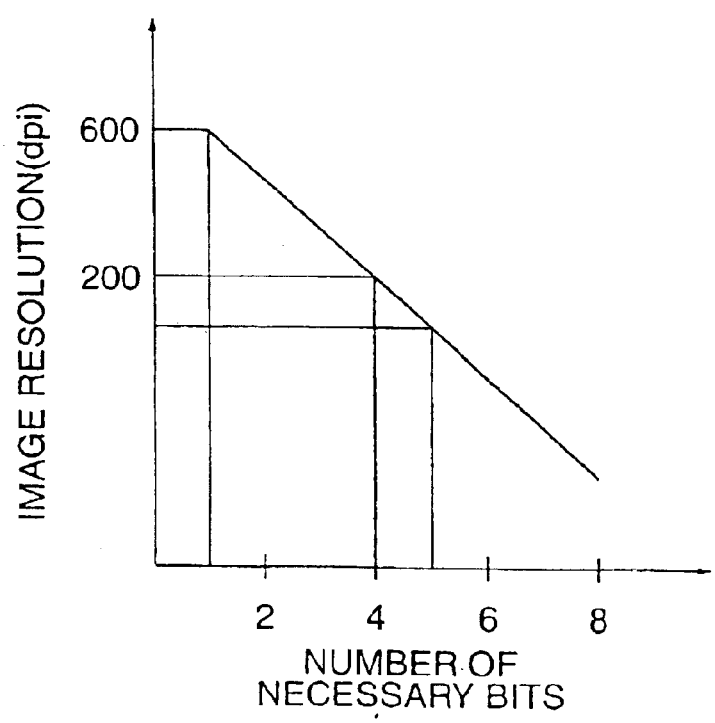
FIG. 23 is a conceptual diagram (2) describing the relation between the necessary number of bits and the image resolution.
Figure 28:
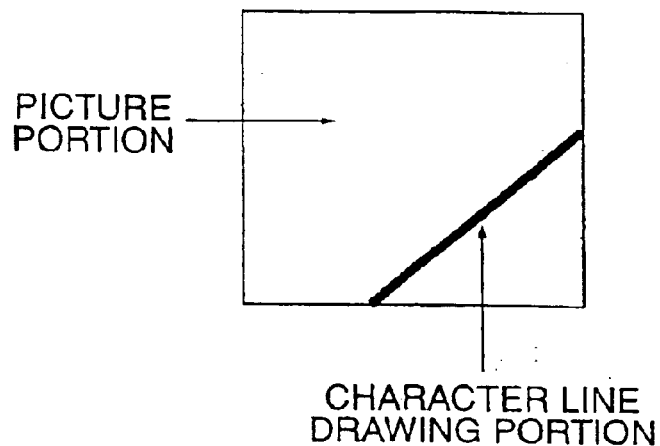
FIG. 28 is a diagram illustrating the mixed character/line drawing and picture.
Figure 29:
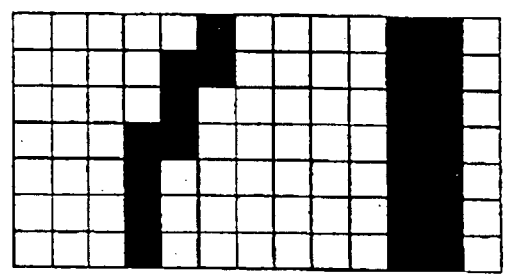
FIG. 29 is a diagram illustrating the binary font.
Figure 30:
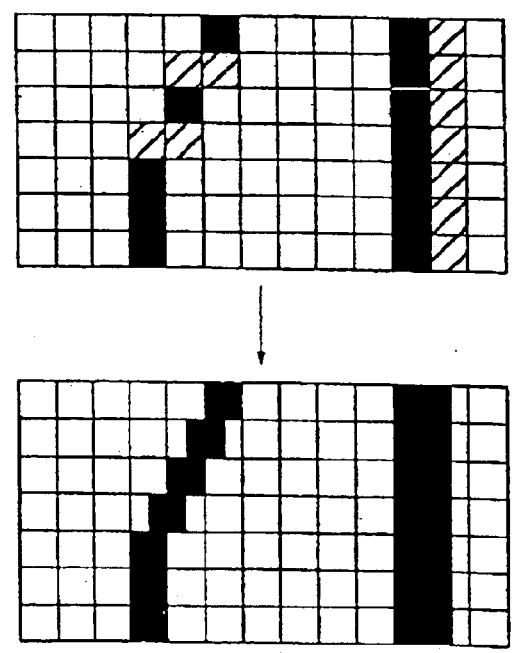
FIG. 30 is a diagram illustrating the gray font.
Figure 31:
FIG. 31 is a diagram illustrating the vernier acuity.

Furthermore, the graph shown in FIG. 22 is rewritten so that the axis of ordinate represents the resolution (dpi). By converting FIG. 22 under the assumption that the visual range is 30 cm, for example, a graph as shown in FIG. 23 is obtained. In FIG. 23, it is apparent that 8 bits are sufficient to express an image having the frequency that is expressed with the resolution equal to or lower than 200 dpi.

An image having the frequency that is expressed with the resolution from 200 dpi to 600 dpi can be expressed by expressing 600 dpi with 4 bits. In other words, in association with the relation between the visual range and the visual frequency characteristic, in the case of the characteristic shown in FIG. 23, 600 dpi image is expressed with 4 bits, and 200 dpi image is expressed with 8 bits. The first embodiment presents a detailed example that realizes the two-dividing image encoding method.

Figure 1:
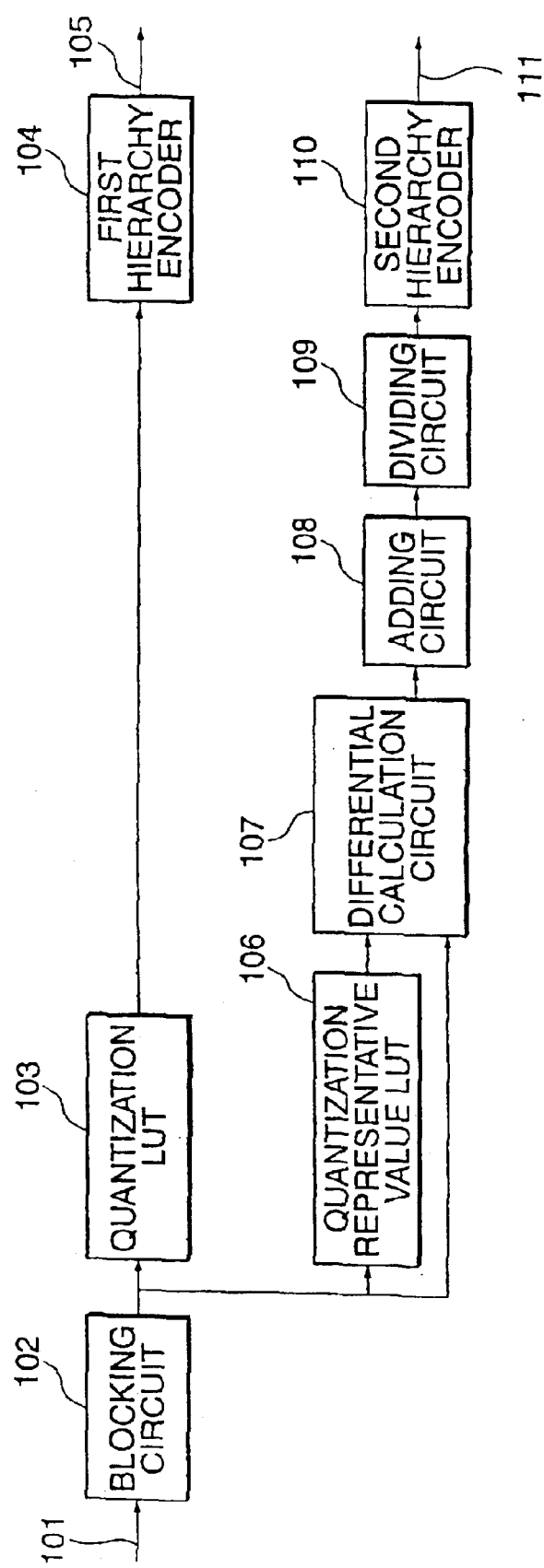
FIG. 1 is a structural diagram illustrating an image encoding apparatus of the first embodiment.

FIG. 1 is a block diagram for illustrating the first embodiment. In FIG. 1, 101 denotes an input image, 102 denotes a blocking circuit for dividing the input image into blocks, 103 denotes a quantization LUT (lookup table) for quantizing an image in a block, 104 denotes a first hierarchy encoder for encoding a quantized image, 105 denotes a first hierarchy code, 106 denotes a quantization representative value LUT for obtaining a quantization representative value of an image in a block, 107 denotes a differential calculation circuit for calculating the difference between the quantization representative value and the input pixel value, 108 denotes an adding circuit for obtaining the sum of the differentials calculated by the differential calculation circuit 107, 109 denotes a dividing circuit that divides the added differential sum by a predetermined value, and 110 denotes a second hierarchy encoder for encoding the divided differential sum.

Next, the operation of the image encoding apparatus of the first embodiment will be described. The input image 101 having the resolution of 600 dpi is supplied to the blocking circuit 102. The blocking circuit 102 divides the input image supplied in the order of raster into blocks having 3×3 pixels. 3×3 pixels of 600 dpi pixel block correspond to 1 pixel of 200 dpi resolution (refer to FIG. 15).

Figures 15, 16:
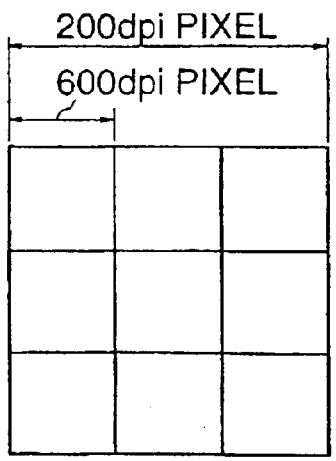
FIG. 15 is a diagram illustrating a blocking circuit.
FIG. 16 is a table showing an exemplary quantization LUT.

The pixel blocked by the blocking circuit 102 is supplied to the quantization LUT 103. An exemplary quantization LUT 103 is shown in FIG. 16. The 8-bit data is converted by the quantization LUT 103 to the 4-bit data and it is sent out. Herein, the LUT is set so that the decoded image is 0 when the input is 0, and the decoded imaged is 255 when the input is 255. In other words, the index is 0 only when the input value is 0, and the index value is 15 only when the input value is 255.

Furthermore, the pixel that has been blocked by the blocking circuit 102 is supplied to the quantization representative value LUT 106, and a quantization representative value is sent out. An exemplary quantization representative value LUT is shown in FIG. 17. Herein, the central value of the input value that is to be the same quantization index is sent out as the quantization representative value.

Next, the quantization index quantized by the quantization LUT 103 is encoded by the first hierarchy encoder 104, and converted to the first hierarchy code 105. The first hierarchy encoder encodes it together with images of other blocks. The reversible encoding method such as LZ method is suitable as the encoding method to be employed for the first hierarchy encoder 104. The quantization index may be decomposed to bit plane and the binary reversible method such as JBIG method or MH or MMR method is applied. Otherwise, the non-reversible image encoding method such as JPEG method may be applied.

On the other hand, the quantization representative value obtained by the quantization representative value LUT 106 and the output value from the blocking circuit 102 are supplied to the differential calculation circuit 107, and the differentials are calculated for every pixel. Herein, it is assumed that the input pixel value in a block is Xi and the quantization representative value is Yi. Wherein, i is an integer in a range from 0 to 8, and indicates the position in a block. The same value of the character i means the location on the same position in a block.

The differential calculation circuit 107 calculates Xi−Yi as the differential for each pixel position in a block.

The differential calculated by the differential calculation circuit 107 is supplied to the adding circuit 108, and the differential sum is calculated according to the equation Σ(Xi−Yi).

The differential sum calculated by the adding circuit 108 is supplied to the dividing circuit 109, and the lower 4 bits are discarded according to round-off. Because the number of effective bits of the differential sum is approximately 4 bits after discarding, the number of effective gradations of the 200 dpi image is approximately 8 bits. (It is possible to obtain the desired value of the number of effective gradations by reducing the number of discarding bits to improve the number of effective gradations.)

The discarded result is supplied to the second hierarchy encoder 110. The second hierarchy encoder 110 encodes it together with images of other blocks. The reversible encoding method such as LZ method may be employed as the encoding method for the second hierarchy encoder 104. The discarded result may be decomposed into bit plane and the binary reversible method such as JBIG method or MH or MMR method may be employed. Otherwise, the non-reversible image encoding method such as JPEG method may be employed.

Figure 2:
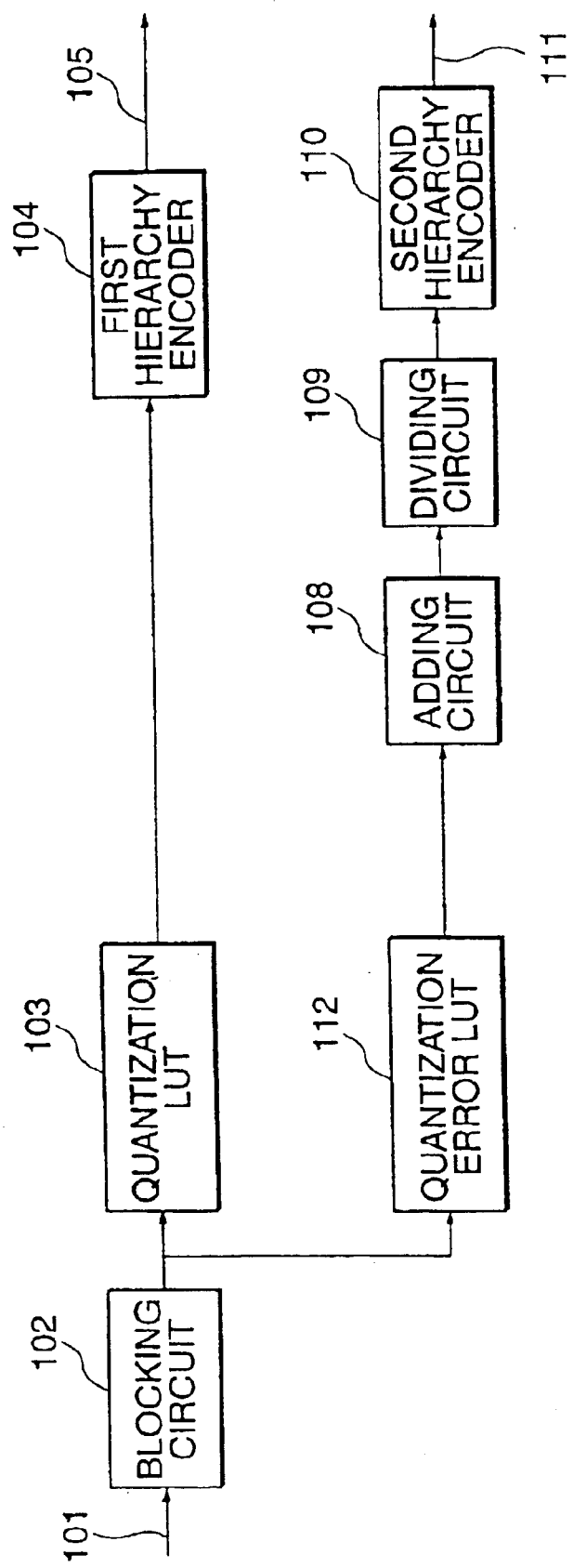
FIG. 2 is a structural diagram illustrating another example of an image encoding apparatus of the first embodiment.

Next, another exemplary image encoding apparatus of the first embodiment will be described. FIG. 2 is a structural diagram for illustrating the another example. In detail, the image encoding apparatus of another example is different from the image encoding apparatus of the first embodiment described hereinabove in that the part having the quantization representative value LUT 106 and the differential calculation circuit 107 in the previous image encoding apparatus is replaced by the part having a quantization error LUT 112.

The quantization error LUT 112 integrates the quantization error value corresponding to the pixel value in the block. When a pixel value is supplied, the quantization error value corresponding to the pixel value is generated. The quantization error value is identical with the quantization representative value shown in FIG. 17.

Herein, assuming that the input pixel value is P and the quantization representative value corresponding to the input pixel value P is I, the quantization error LUT 112 is set to generate I corresponding to the input pixel value P as the puantization error value. Thereby, the differential calculation circuit 107 of the image encoding apparatus of the first embodiment described previously can be omitted, and the apparatus structure is simplified.

Figure 3:
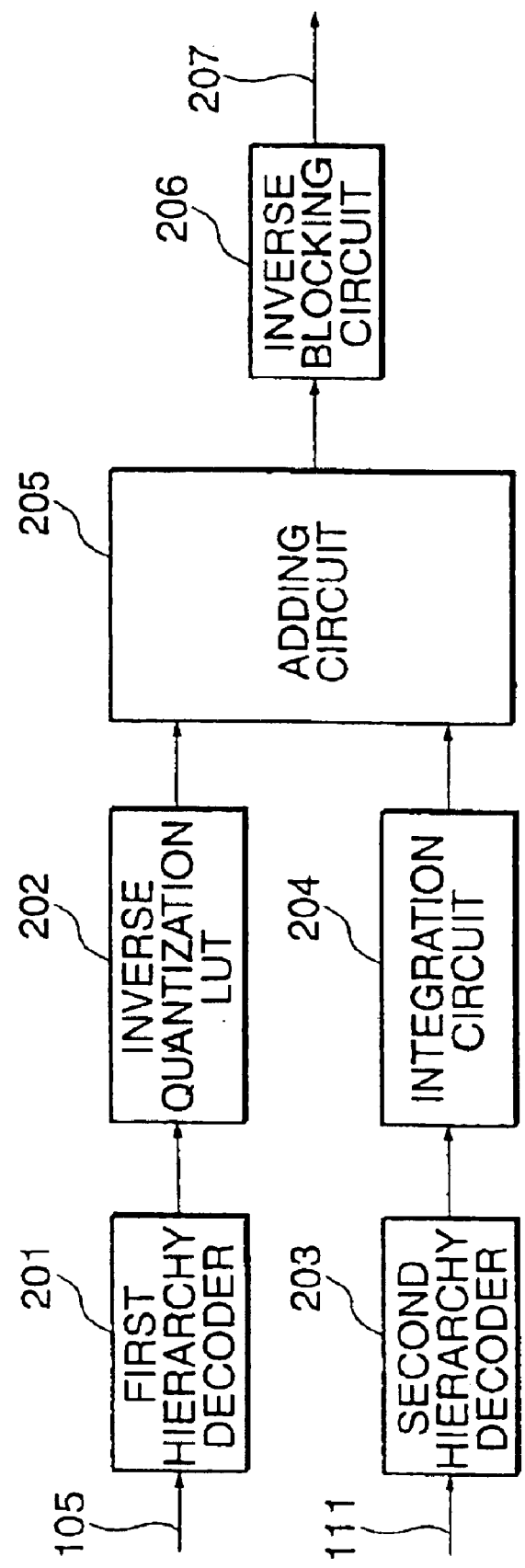
FIG. 3 is a structural diagram illustrating-an image decoding apparatus of the first embodiment.

Next, the image decoding apparatus of the first embodiment will be described. FIG. 3 is a block diagram for illustrating the structure of an image decoding apparatus of the first embodiment. In FIG. 3, 105 denotes a first hierarchy code, 111 denotes a second hierarchy code, 201 denotes a first hierarchy decoder, 202 denotes an inverse quantization LUT, 203 denotes a second hierarchy decoder, 204 denotes an integration circuit, 205 denotes an adding circuit, 206 denotes an inverse blocking circuit, and 207 denotes a decoded image.

The operation of the image decoding apparatus of the first embodiment will be described with reference to FIG. 1 and FIG. 3 hereunder. The first hierarchy code 105 encoded by the first hierarchy encoder 104 is decoded by the first hierarchy decoder 201, and a quantization index is sent out.

The quantization index is inversely quantized by the inverse quantization LUT 202, and a first hierarchy image is obtained. An exemplary inverse quantization LUT is shown in FIG. 18. The content of the inverse quantization LUT 202 should be identical with the content of the quantization LUT 103 and the quantization representative value LUT 106.

Furthermore, the second code 111 encoded by the second hierarchy encoder 110 is decoded by the second hierarchy decoder 203, and the divided differential sum is generated. The divided differential sum is subjected to the calculation that is reverse to what was performed in encoding by the integration circuit 204. Because the lower 4 bits are discarded according to round-off in the image encoding apparatus of the first embodiment, the differential sum can be reproduced by left 4-bit shifting in the integration circuit 204.

The differential sum obtained by the integration circuit 204 and the first hierarchy image obtained by the inverse quantization LUT 202 are supplied to the adding circuit 205. The operation of the adding circuit 205 will be described hereinafter.

Herein, it is assumed that the pixel value of the first hierarchy image is denoted by Yi and the differential sum obtained by the integration circuit 204 is denoted by Z. Furthermore, the value obtained by the second hierarchy decoder 203 is used as the differential value of 1 pixel average. This value is denoted by w. Z=16×w.

Furthermore, the pixel value variation permission range LUT is used in the adding circuit 205. The pixel value variation permission range LUT is the value that is allowed to be distant from the quantization representative value during decoding with input of the quantization index. An example of the pixel value variation permission range LUT is shown in FIG. 19. Herein, in the case of the quantization index of 0 and 15, the permission range is 0 to guarantee the pixel value, and on the other hand in the case of the quantization index of other values, the permission range is set so as to be included in the pixel value range specified by the vernier acuity. (As an example, the pixel value error specified by the vernier acuity is 18 herein. To suppress the variation of the difference between pixel values of adjacent pixels to a value equal to or smaller than 18, the variation of each pixel value should be equal to or smaller than 9.)

At first, the adding circuit 205 adds w to the pixel of the first hierarchy image in the block. In the case where w is included within the pixel value variation permission range, w is added. On the other hand, in the case where w is equal to or larger than the pixel value variation permission range, the maximum value of the pixel value variation permission range is added. The value added to each pixel is subtracted from Z.

Next, the addition order for 9 pixels in the block is determined previously. For example, the order as shown in FIG. 20 is determined previously. The differential sum is added just up to the pixel value variation permission range in the order shown in FIG. 20. The added value is subtracted from Z successively, and the addition is brought to an end at the time point when Z becomes 0. Through the process described hereinabove, the 600 dpi pixel value in the block is decoded.

Thereafter, the output from the adding circuit 205 is supplied to the inverse blocking circuit 206. The inverse blocking circuit 206 subjects the image data decoded for every block to scanning transformation and generates a decoded image 207.

As described hereinabove, the first embodiment can control the number of gradations of the 600 dpi pixel that is the input image resolution so as to be a value that is sufficient to guarantee the edge position specified by the vernier acuity, and can guarantee the number of desired gradations (for example, 8 bits) of the 200 dpi image resolution.

In other words, the 600-dip pixel value is reduced from 8 bits to 4 bits. The 200-dip pixel value is 4 bits, and is 4/9 bit per pixel in terms of 600 dpi. It is possible to compress the image from 8 bits to 4+4/9 bits without any special image compression. Further compression is applicable, and in this case 4+4/9 bits can be reduced the more.

In the first embodiment, the effect described hereunder is obtained. The divisor of the dividing circuit is rendered 2 to the power, and the calculation is thereby simplified. The number to be added first in the adding circuit is used as the output unit of the second hierarchy decoder, and as the result the calculation is simplified. Furthermore, the adding circuit adds the average value to the pixel of the first hierarchy image to thereby add many differential values to a part of the pixel, and as the result the mal-distribution of error in the block is prevented.

Furthermore, the quantizer is provided with the LUT for non-linear quantization and the adding circuit protects the pixel value variation range, and as the result it is possible to deal with the case in which the error due to the pixel value level is to be prevented from occurring. For example, in the case where the image includes only 0 and 255 as the character image., the error is to be prevented from occurring in the value of 0 and 255. It is possible to be accommodable to a such case.

In the first embodiment, the case where 200 dpi frequency requires 4 bits is shown as an example in FIG. 23, however otherwise, it is necessary to set sufficient number of gradation bits out of the combination of resolutions that is dividable to blocks. As shown in FIG. 24, even in the case where 200 dpi does not require 4 bits, it is necessary to encode 200 dpi with 4 bits for the encoding method.

The resolution of the second hierarchy is not limited to 200 dpi, any resolution may be used as long as the resolution is dividable into blocks in relation to the input resolution. In other words, the resolution of the second hierarchy may be A/ndpi (wherein n denotes an integer, and Adpi denotes the input resolution).

Furthermore, by dividing into blocks, the calculation can be closed in a block. In other words, because the range of calculation is limited, the calculation load is reduced. Furthermore, though the quantization representative value LUT is used to calculate the quantization representative value in the examples described hereinabove, the inverse quantization LUT may be used that receives the quantization index input and generates the quantization representative value output.

Furthermore, though non-linear quantization is carried out by use of the LUT as the quantization in the examples described hereinabove, however otherwise, the linear quantization may be employed in which usual dividing is applied. Instead, the upper bits are extracted as they are and they may be used as the quantization index. In this case, the effect that the load is reduced is obtained.

Furthermore, a method may be employed, in which a special quantization index is given only when the input value is a specific value (for example, 0 and 255) and the upper bits are extracted as they are and they may be used as the quantization index when the input value is not the specific value.

Furthermore, though the value w obtained by the second hierarchy decoder 203 is used as the value similar to the average value in the adding circuit 205 in the examples described hereinabove, the average value that is obtained by actual calculation may be used instead. For example, in this case, the average value is obtained by calculation of Z/9.

Furthermore, in the examples described hereinabove, the average value of the differential per pixel is added first by the adding circuit 205, and then the residual differential sum is added for every pixel. However, the residual differential sum may be added for every pixel first without addition of the average value of the differential per pixel. As for the order of addition, for example, the order as shown in FIG. 20 may be employed. Furthermore, when addition is carried out, the differential sum is added just up to the pixel value variation permission range in the order shown in FIG. 20. The added value is subtracted from Z successively, and the addition is brought to an end when Z becomes 0, and thus the average value of 200 dip pixel and the threshold value of the vernier acuity can be guaranteed.

(Second Embodiment)

An image encoding apparatus of the second embodiment is different from the image encoding apparatus of the first embodiment only in the operation of the dividing circuit 109.

In the first embodiment described hereinbefore, the value of 2 to the power (for example 16) is used for dividing calculation by the dividing circuit 109 shown in FIG. 1. However, in the second embodiment, the number of pixels 9 in the block is used for dividing calculation.

A correct average value is calculated for 200 dip resolution to thereby secure the necessary and sufficient information quantity for 200 dip. In the case where the value of 2 to the power is used for dividing calculation as in the case of the first embodiment, though the calculation load is reduced, the information quantity is not sufficient to guarantee the image quality.

Furthermore, in the case of the image decoding apparatus of the second embodiment, the integration circuit 204 shown in FIG. 3 integrates the pixel value 9. The output of the second hierarchy decoder 203 is used as it is as the average value in the case where addition is carried out in two step by the addition circuit 205.

(Third Embodiment)

An encoding apparatus of the third embodiment is different from the encoding apparatus of the first embodiment only in the operation of the dividing circuit 109.

In the third embodiment, the divisor of the dividing circuit 109 is set so that the dynamic range of the output bit width of the dividing circuit 109 is used entirely. The effect of the third embodiment is to provide the data for best compression efficiency in the case where the output of the dividing circuit 109 is not compressed any more.

For example, in the quantization by use of the quantizer having the quantization representative value as shown in FIG. 17, at worst the error of ±9 pixel value per pixel occurs. Because up to 9 pixels having the error of ±9 pixel value occur, the maximum value of the differential sum that is the output of the adding circuit 108 shown in FIG. 1 is ±81. The dynamic range of the pixel value is corresponding to 81+81+0=163-pixel value. A number in the range from −81 to +81 is denoted by the value K expressed with 0 to 162. The pixel value is quantized and denoted by N bits (for example, 4 bits). 162/16=10.125.

For example, by setting the divisor to be 10.2 and setting the operation of the dividing circuit 109 to be K/10.2, the dynamic range (0 to 15) of the bit after dividing calculation can be used effectively.

(Fourth Embodiment)

In the first embodiment described hereinbefore, the example in which the input image is divided into two hierarchies for encoding is described. In the first embodiment, the resolution of the high resolution image is limited to the integral multiple of the resolution of the low resolution image because the blocking is carried out. On the other hand, in the fourth embodiment that is the generalized first embodiment, the limitation on the resolution and the number of gradations is eliminated. Furthermore, the process up to the dividing of the input image into m hierarchy images will be described in the fourth embodiment.

Images formed by dividing the input image into m hierarchy images are encoded independently for compression. In this case, each divided image is subjected to corresponding decoding in decoding and each hierarchy image is decoded.

The concept of the fourth embodiment will be described hereunder. It is assumed that the image resolution of f8 requires 4 bit information for the vernier acuity. Furthermore, it is assumed that the visual frequency characteristic as shown in FIG. 22 is effective.

At that time, if the information described hereunder is given, then the image is expressed without the image quality strain.

4-bit information having the image resolution of f8.
5-bit information having the image resolution of f5.
6-bit information having the image resolution of f4.
7-bit information having the image resolution of f3.
8-bit information having the image resolution of f2.

5-hierarchy image information as described hereinabove may be given. Herein, because "5-bit information having the image resolution of f5" is not independent of "4-bit information having the image resolution of f8", only the independent differential information may be encoded. The information having other resolution may be encoded in the same way. Furthermore, the resolution information having the image resolution equal to or higher than f5 may be subjected to reduction to reduce the number of gradations.

When plural resolution images are unified into one, the highest value of the resolution and number of bits is used. For example, by combining the image resolution of f5 and f4 and by combining the image resolution of f3 and f2, the reduction is possible as described hereunder.

4-bit information having the image resolution of f8
6-bit information having the image resolution of f5
8-bit information having the image resolution of f3

Furthermore, to round-up the image resolution, the resolution higher than the abovementioned resolution is used. For example, in the case where the resolution of f5 of the second hierarchy is 258 dpi and it is difficult to realize this resolution due to the large load on the mounting, now the resolution is changed to the resolution of 100 dpi unit. To change the resolution, the resolution of the second hierarchy equal to or higher than 258 dpi is required. For example, 300 dpi is used. The number of bits is 6 bits as in the case of f5.

Figure 4:
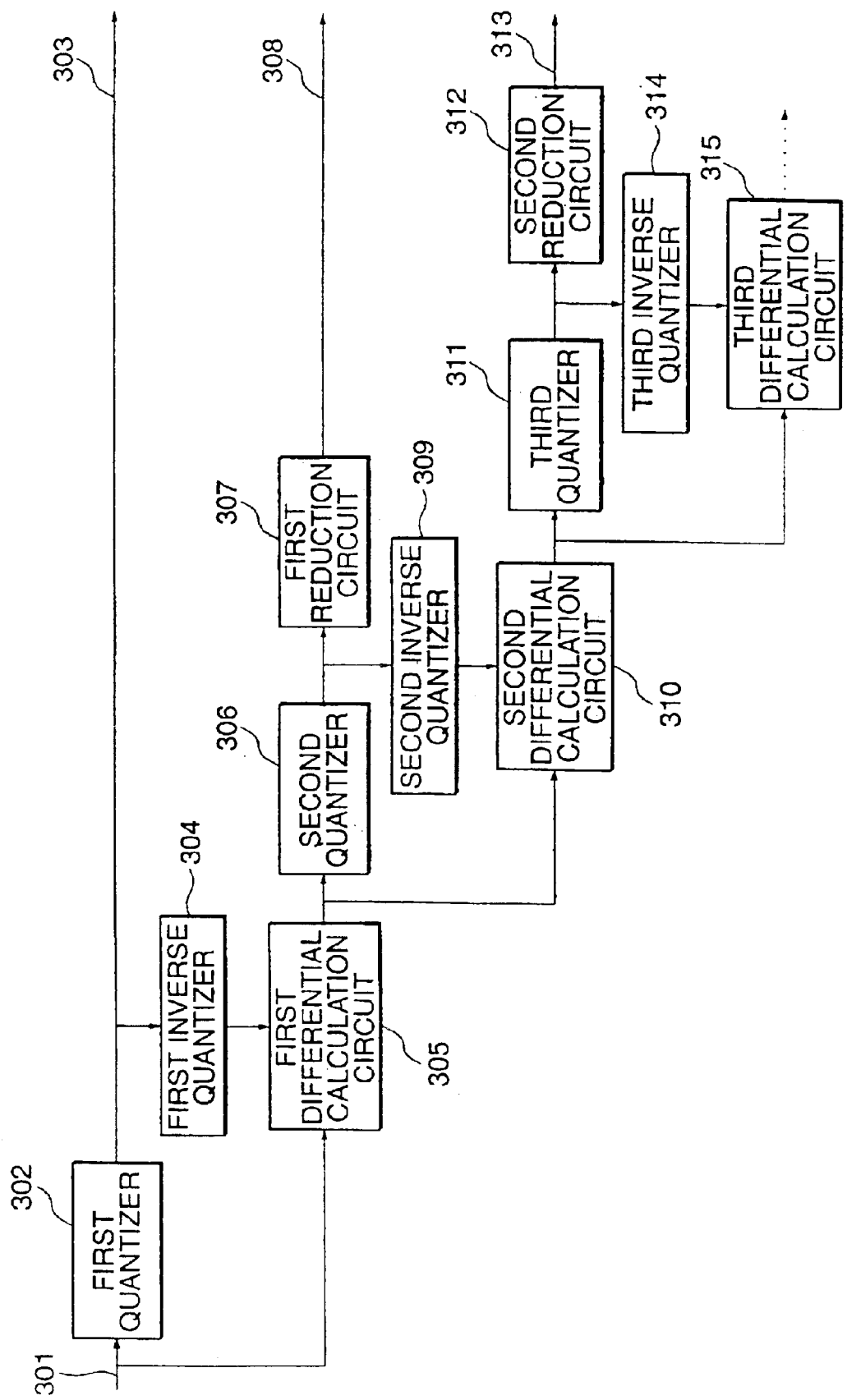
FIG. 4 is a structural diagram (1) illustrating the fourth embodiment.

The operation of the fourth embodiment will be described with reference to FIG. 4, FIG. 5, and FIG. 6. In FIG. 4, 301 denotes an input image, 302 denotes an first quantizer, 303 denotes a first hierarchy image, 304 denotes a first inverse quantizer, 305 denotes a first differential calculation circuit, 306 denotes a second quantizer, 307 denotes a first reduction circuit, 308 denotes a second hierarchy image, 309 denotes a second inverse quantizer, 310 denotes a second differential calculation circuit, 311 denotes a third quantizer, 312 denotes a second reduction circuit, 313 denotes a third hierarchy image, 314 denotes a third inverse quantizer, and 315 denotes a third differential calculation circuit.

Figure 5:
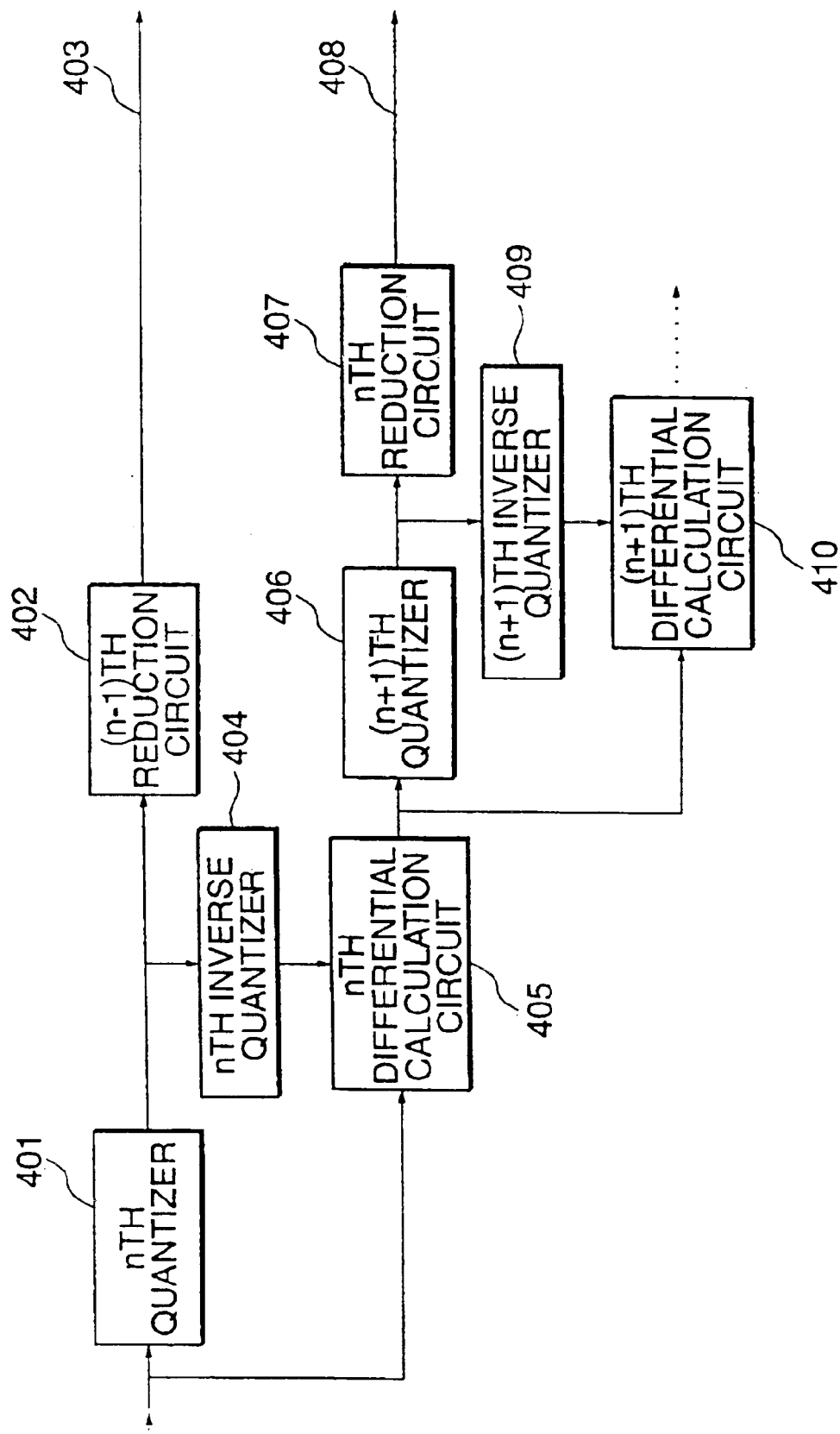
FIG. 5 is a structural diagram (2) illustrating the fourth embodiment.

Furthermore, in FIG. 5, 401 denotes an n-th quantizer, 402 denotes an (n−1)th reduction circuit, 403 denotes an n-th hierarchy image, 404 denotes an n-th inverse quantizer, 405 denotes an n-th differential calculation circuit, 406 denotes an (n+1)th quantizer, 407 denotes an n-th reduction circuit, 408 denotes an (n+1)th hierarchy image, 409 denotes an (n+1)th inverse quantizer, and 410 denotes an (n+1)th differential calculation circuit.

Figure 6:
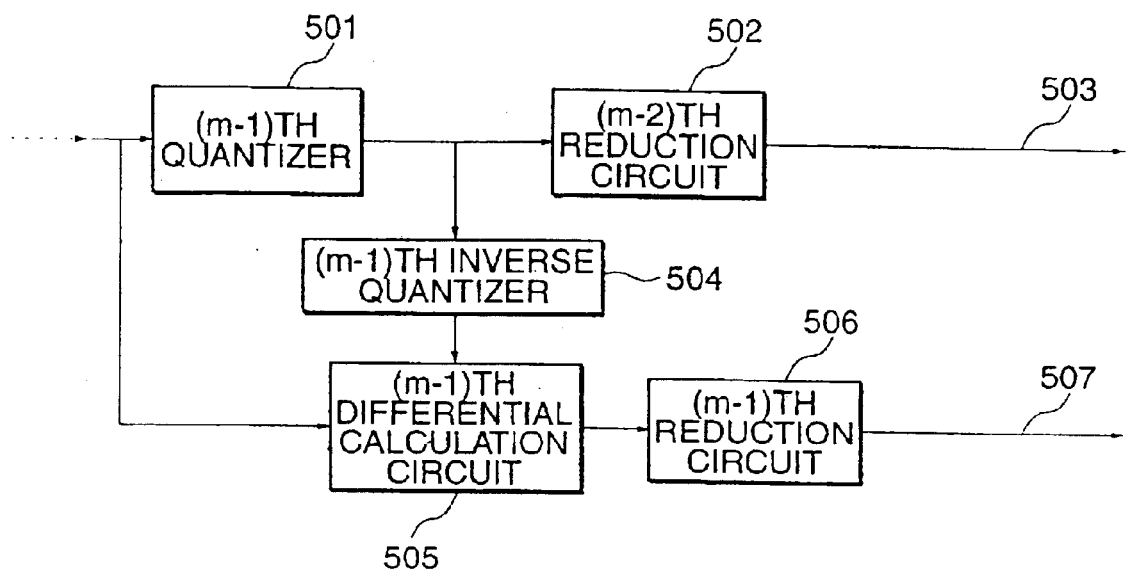
FIG. 6 is a structural diagram (3) illustrating the fourth embodiment.

Furthermore, in FIG. 6, 501 denotes an (m−1)th quantizer, 502 denotes an (m−2)th reduction circuit, 503 denotes an (m−1)th hierarchy image, 504 denotes an (m−1)th inverse quantizer, 505 denotes an (m−1)th differential calculation circuit, 506 denotes an (m−1)th reduction circuit., and 507 denotes an mth hierarchy image.

In FIG. 4, the input image 301 is supplied to the first quantizer 302, and a quantization index is generated. For example, an LUT as shown in FIG. 16 is used as the quantizer. Otherwise, the LUT is implemented by the linear quantization in which dividing calculation is carried out with a predetermined quantization step size or extraction of the upper bits of the input data.

The quantization index is generated as the first hierarchy image 303. Furthermore, the quantization index is supplied to the first inverse quantizer 304, and the first quantization representative value that is generated by subjecting the quantization index to the inverse quantization is generated.

Furthermore, the quantization representative value and the input image 301 are supplied to the first differential calculation circuit. The first differential calculation circuit 305 calculates the differential (first differential) between the input image 301 and the quantization representative value, and supplies it to the second quantizer. The second quantizer quantizes the first differential, and the first reduction circuit 307 reduces the resolution to a desired value.

Furthermore, the second inverse quantizer 309 inversely quantizes the output of the second quantizer, and generates the second quantization representative value. The second differential calculation circuit 310 calculates the differential (second differential) between the second quantization representative value and the first differential.

Following the above, the third quantizer 311, the second reduction circuit 312, the third hierarchy image 313, the third quantizer 314, and the third differential calculation circuit 315 operate in the same manner.

The general operation for generating the (n+1)th hierarchy image is shown in FIG. 5. The output (nth differential) of the n-th differential calculation circuit 405 is supplied to the (n+1)th quantizer 406 and the (n+1)th differential calculation circuit 410. The (n+1)th quantizer 406 quantizes the n-th differential, and the n-th reduction circuit 407 reduces the resolution of the quantization index to the resolution of the (n+1)th hierarchy image and generates the (n+1)th hierarchy image 408.

Furthermore, the (n+1)th inverse quantizer 409 inversely quantizes the output of the (n+1)th quantizer 406, and the (n+1)th quantization representative value is generated. The (n+1)th differential calculation circuit 410 calculates the differential ((n+1)th differential) between the (n+1)th quantization representative value and the n-th differential.

Furthermore, the operation for generating the final hierarchy (mth hierarchy) image is shown in FIG. 6. The output (the (m−1)th differential) of the (m−1)th differential calculation circuit 505 is supplied to the (m−1)th reduction circuit 506, and the m-th hierarchy image 507 is generated.

Figure 7:
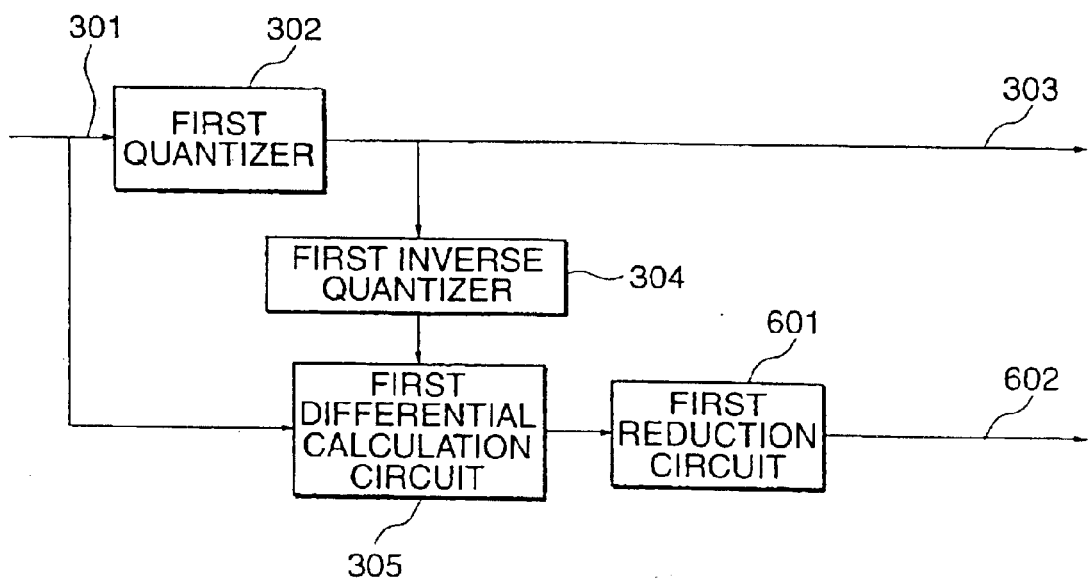
FIG. 7 is a structural diagram illustrating the case of two hierarchies.

Similarly, the operation in the case of two hierarchies is shown in FIG. 7. In FIG. 7, 601 denotes a first reduction circuit, and 602 denotes a second hierarchy image. FIG. 7 is different from FIG. 4 only in that the output of the first differential calculation circuit 305 is supplied only to the first reduction circuit 601 and the second hierarchy image 602 is generated. The general exemplary apparatus for dividing into m hierarchies is described hereinabove.

The detailed example of the fourth embodiment will be described hereinafter. The input image resolution is 600 dpi, and the number of gradation is 256 (8 bits)the input image is divided into three hierarchies.

4-bit information having the image resolution of 600 dpi.
6-bit information having the image resolution of 300 dpi.
8-bit information having the image resolution of 200 dpi.

The upper 4 bits of the input image are sent out as the first hierarchy image. The lower 4 bits of the input image are generated as the output of the first differential calculation. In this case, the quantization representative value is a value that is generated by shifting the quantization index by 4 bits to the left, and the operation of the inverse quantizer and the operation of the differential calculation circuit occur simultaneously.

The upper 2 bits out of the lower 4 bits of the input image is reduced so as to correspond to 300 dpi, and it is sent out as the second hierarchy image. The lower 2 bits out of the lower 4 bits of the input image is reduced so as to correspond to 200 dpi, and it is sent out as the third hierarchy image. As described hereinabove, division into m hierarchies is possible generally. In such case, the compression rate can be increased the more in comparison with the case of two hierarchies.

(Fifth Embodiment)

In the first embodiment described hereinbefore, the example in which the input image is divided into two hierarchies for encoding is described. Furthermore, the resolution of the high resolution image is limited to the integral multiple of the resolution of the low resolution image for blocking. The fifth embodiment is similar to the fourth embodiment in that the first embodiment is generalized and the restriction on the resolution and on the number of gradations is eliminated.

Furthermore, the process up to the dividing of the input image into m hierarchy images will be described in the fourth embodiment. Furthermore, in the fourth embodiment, the resolution of the image divided with the differential of the input image resolution is reduced to the desired resolution at a time. On the other hand, in the fifth embodiment, the image encoding apparatus in which the resolution is reduced step-wise from high resolution to obtain m reduced images will be described.

The images divided into m hierarchies are encoded independently to thereby compress the more. In this case, the corresponding decoding is applied when decoding to thereby decode each hierarchy image.

Figure 8:
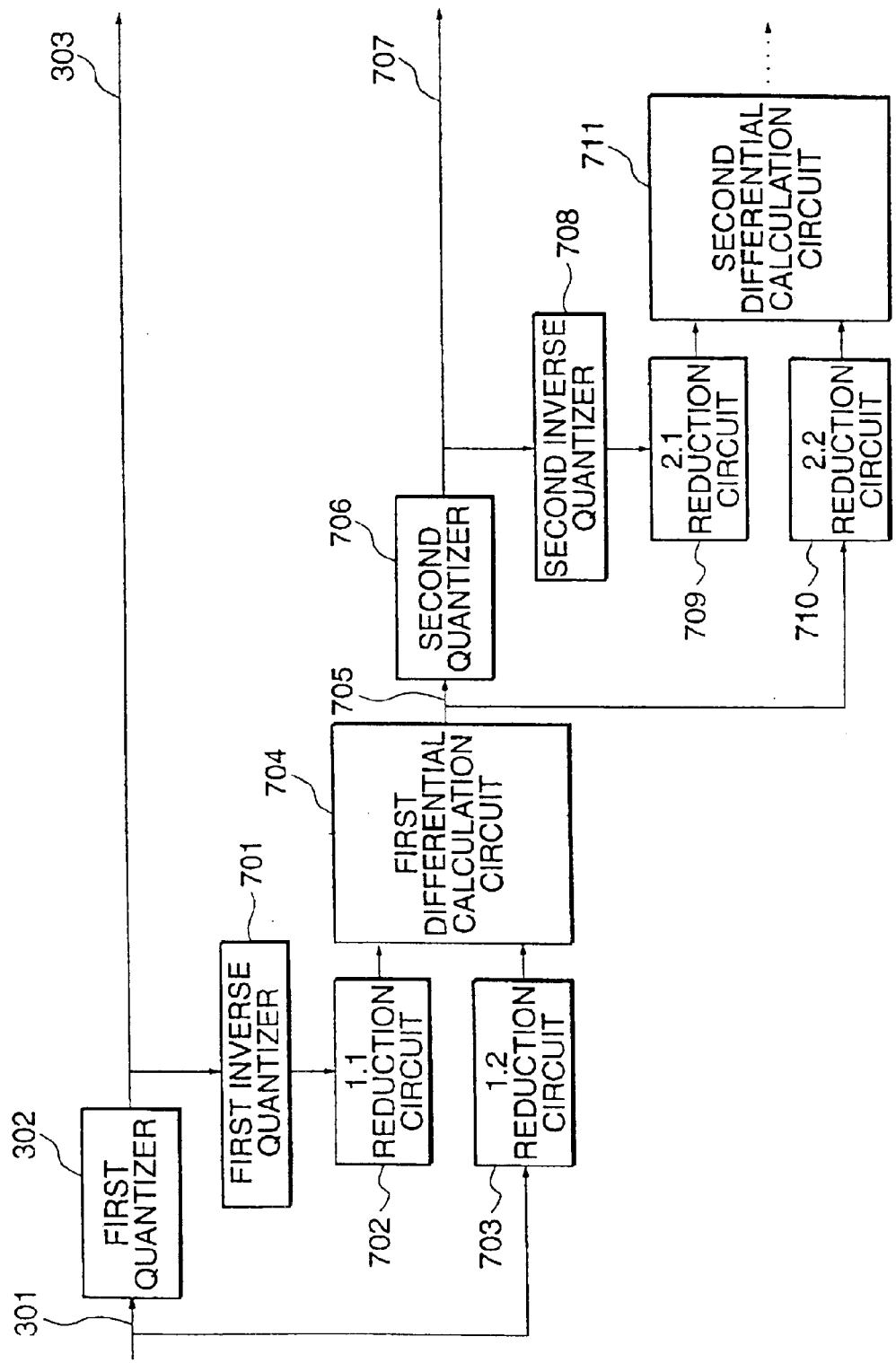
FIG. 8 is a structural diagram (1) illustrating the fifth embodiment.

The concept of the fifth embodiment is the same as the concept of the fourth embodiment. The operation of the fifth embodiment will be described with reference to FIG. 8, FIG. 9, and FIG. 10 hereinafter. In FIG. 8, 301 denotes an input image, 302 denotes a first quantizer, 303 denotes a first hierarchy image, 701 denotes a first inverse quantizer, 702 denotes a 1.1 reduction circuit, 703 denotes a 1.2 reduction circuit, 704 denotes a first differential calculation circuit, 705 denotes a first differential, 706 denotes a second quantizer, 707 denotes a second hierarchy image, 708 denotes a second inverse quantizer, 709 denotes 2.1 reduction circuit, 710 denotes a 2.2 reduction circuit, and 711 denotes a second differential calculation circuit.

Figure 9:
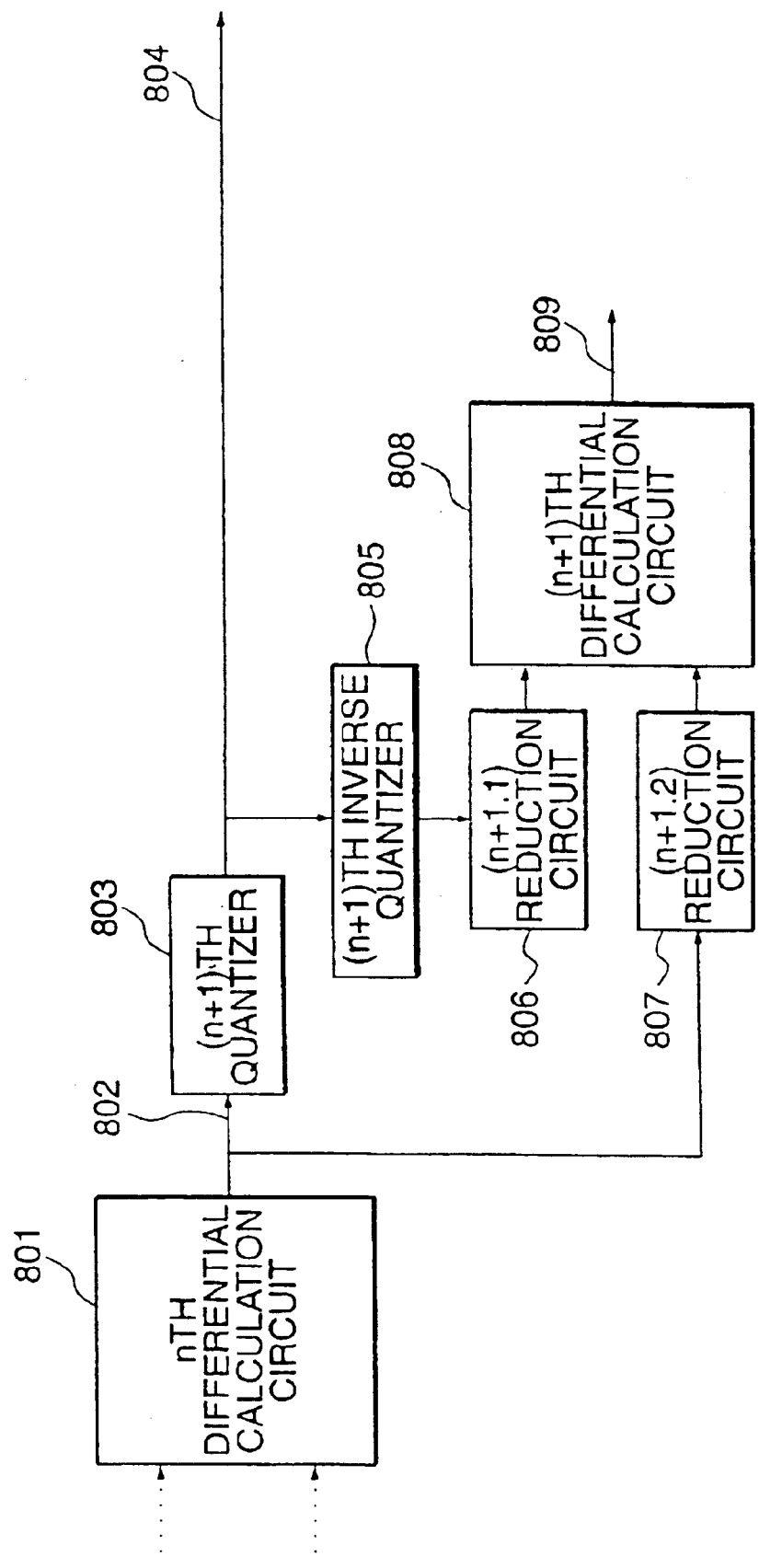
FIG. 9 is a structural diagram (2) illustrating the fifth embodiment.

In FIG. 9, 801 denotes an n-th differential calculation circuit, 802 denotes an n-th differential, 803 denotes an (n+1)th quantizer, 804 denotes an (n+1)th hierarchy image, 805 denotes an (n+1)th inverse quantizer, 806 denotes an (n+1.1) reduction circuit, 807 denotes an (n+1.2) reduction circuit, 806 denotes an (n+1)th differential calculation circuit, and 809 denotes an (n+1)th differential.

Figure 10:
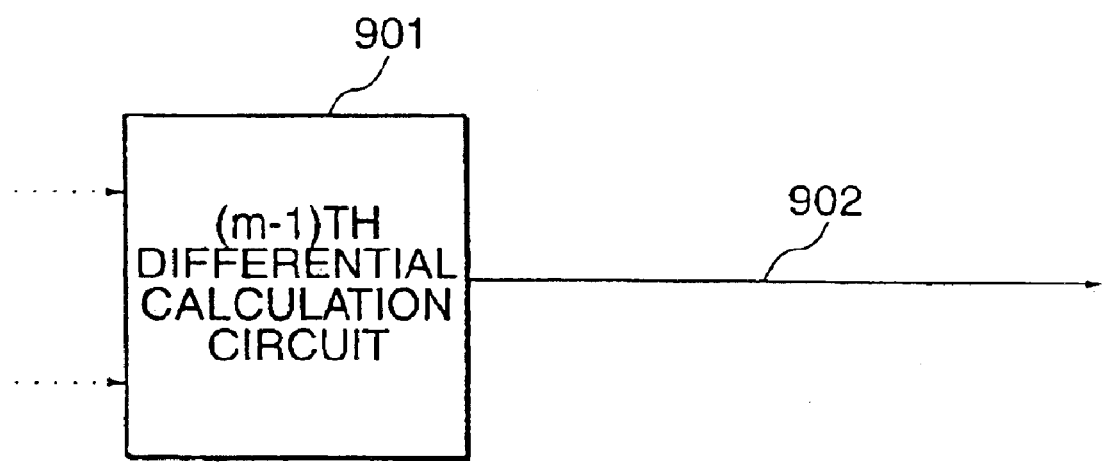
FIG. 10 is a structural diagram (3) illustrating the fifth embodiment.

Furthermore, in FIG. 10, 901 denotes an (m−1)th differential calculation circuit, and 902 denotes an m-th hierarchy image.

In FIG. 8, the operation of the first quantizer 302 and the first hierarchy image 303 is the same as that described in the fourth embodiment. In FIG. 8, the input image 301 is supplied to the 1.2 reduction circuit 703, and in which the resolution of the input image 301 is reduced to the resolution of the second hierarchy image. Similarly, the output that is inversely quantized by the first inverse quantizer 701 is supplied to the 1.1 reduction circuit 702, and the resolution is reduced to the resolution of the second hierarchy image.

The first differential calculation circuit 704 calculates the differential between the outputs of two reduction circuits, and generates the first differential 705. The second quantizer 706 quantizes the first differential 705 and sends out it as the second hierarchy image 707. Following the above, the second inverse quantizer 708, the 2.1 reduction circuit 709, the 2.2 reduction circuit 710, and the second differential calculation circuit 711 operate similarly.

Furthermore, the general operation for generating the (n+1)th hierarchy image is shown in FIG. 9. The n-th differential that is the output from the n-th differential calculation circuit 801 is quantized by the (n+1)th quantizer 803, and it is sent out as the (n+1)th hierarchy image 804. Furthermore, the (n+1)th hierarchy image 804 is inversely quantized by the (n+1) inverse quantizer 805, and it is supplied to the (n+1.1) reduction circuit 806. Similarly, the n-th differential 802 is supplied to the (n+1.2) reduction circuit 807.

The (n+1.1) reduction circuit 806 and the (n+1.2) reduction circuit 807 reduce the resolution of the input image data to the resolution of the (n+2)th hierarchy image. The (n+1) differential calculation circuit 808 calculates the differential (the (n+1)th differential) between the output of the (n+1.1) reduction circuit 806 and the output of the (n+1.2) reduction circuit 807.

Furthermore, the operation for generating the final hierarchy (m-th hierarchy) image is shown in FIG. 10. The (m−1)th differential generated from the (m−1)th differential calculation circuit 901 is sent out as the m-th hierarchy image 902.

Figure 11:
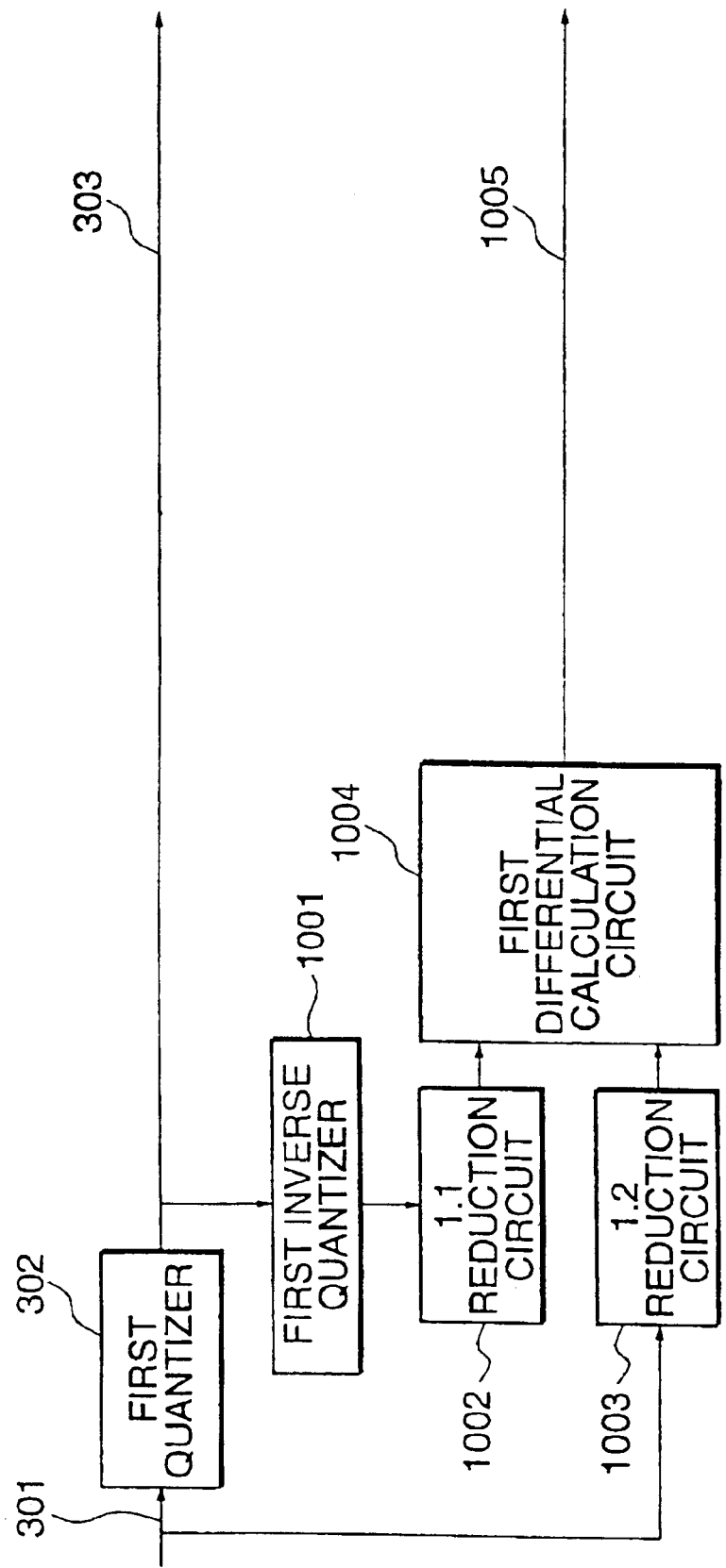
FIG. 11 is a structural diagram illustrating the case of two hierarchies.

Similarly, the operation in the case of two hierarchies is shown in FIG. 11. In FIG. 11, 301, 302, and 303 are described already. 1001 denotes a first inverse quantizer, 1002 denotes a 1.1 reduction circuit, 1003 denotes a 1.2 reduction circuit, 1004 denotes a first differential calculation circuit, and 1005 denotes a second hierarchy image.

The operation in FIG. 11 is different from the operation in FIG. 8 only in that the output of the first differential calculation circuit 1004 is used as the second hierarchy image as it is. The general exemplary apparatus for dividing into m hierarchies is described hereinabove. The detailed example of the fifth embodiment will be described hereunder.

The input image resolution is 600 dpi, the number of gradations is 256 (8 bits), and the input image is divided into three hierarchies.

4-bit information having the image resolution of 600 dpi.
6-bit information having the image resolution of 300 dpi.
8-bit information having the image resolution of 200 dpi.

The upper 4 bits of the input image is sent out as the first hierarchy image. 8-bit data generated by shifting the upper 4 bits of the input image by 4 bits to the left is reduced to ½ (data 1)the input data is reduced to ½ (data 2).

The differential between the data 1 and the data 2 is calculated, and the resultant differential is 4-bit data (data 3). The upper 2 bits of the data 3 is sent out as the second hierarchy data (data 4). (For example, the quantization calculation is defined as described hereinabove.)

The data 4 is shifted by 2 bits to the right, and the resultant data is 4-bit data (data 5)the differential between the data 3 and the data 5 is calculated, and it is reduced to ⅔ and sent out as the third hierarchy data.

(Sixth Embodiment)

In the first embodiment, the quantization index is supplied for the inverse quantizer to thereby obtain the quantization representative value. However otherwise, in the fourth embodiment and the fifth embodiment described hereinabove, the unquantized data may be supplied to thereby obtain the quantization representative value directly.

In the fourth embodiment and the fifth embodiment, the output of the differential circuit or the output of the reduction circuit is used as the final hierarchy image as it is. However, in the case where the output is the redundant data component, the output is further quantized to obtain the final image.

For example, in some cases, the dynamic range is enlarged due to reduction and differentiation to result in the large number of necessary bits. (In spite that the dynamic range of the image is 0 to 15 before reduction, in some cases, the dynamic range increases to a value equal to or larger than 15 by reduction.) In a such case, the increment of the data can be limited by applying quantization restriction or dynamic range restriction to suppress the dynamic range to a desired value. In the case where the quantization is carried out during encoding, the inverse quantization is carried out during decoding.

(Seventh Embodiment)

In the seventh embodiment, an example in which the code encoded by the encoding apparatus of the fourth embodiment or the fifth embodiment is decoded will be described.

In the seventh embodiment, an example in which the resolution of each hierarchy image is converted to the output resolution and then it is inversely quantized and added will be described. The image decoding apparatus of the seventh embodiment is described with reference to FIG. 12.

Figure 12:
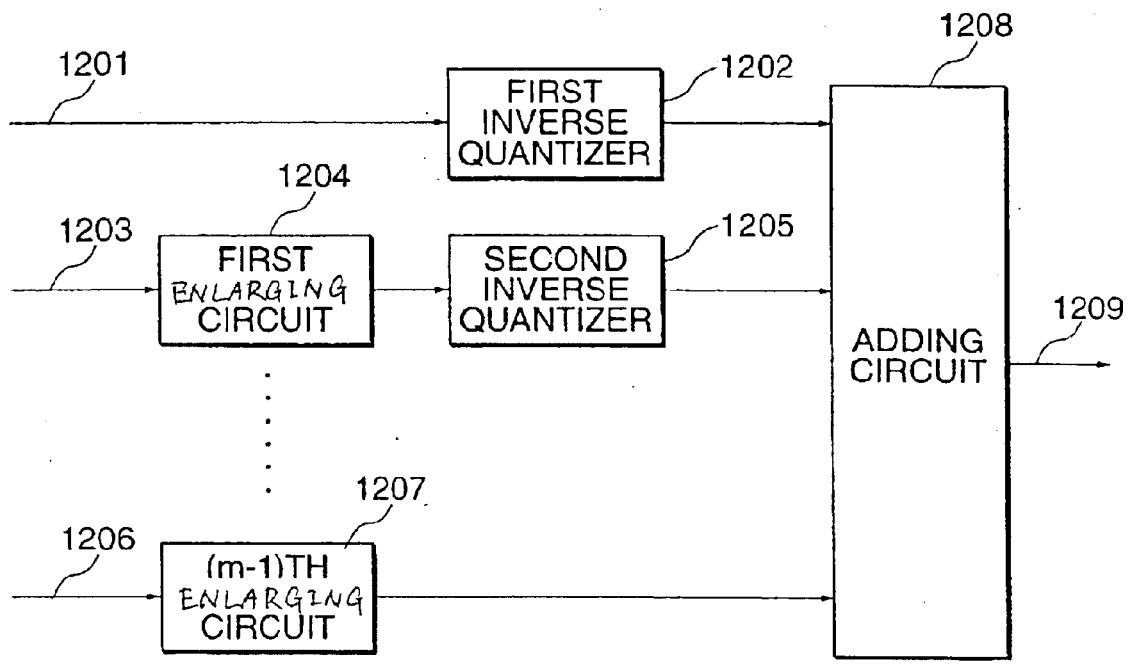
FIG. 12 is a structural diagram illustrating the seventh embodiment.

In FIG. 12, 1201 denotes a first hierarchy image, 1202 denotes a first inverse quantizer, 1203 denotes the second hierarchy image, 1204 denotes a first enlarging circuit, and 1205 denotes a second inverse quantizer. In addition, an n-th enlarging circuit and an (n+1)th inverse quantizer are provided for decoding an n-th hierarchy image. Furthermore, in the final hierarchy, 1206 denotes an m-th hierarchy image, 1207 denotes an (m−1)th enlarging circuit, 1208 denotes an adding circuit, and 1209 denotes a decoded image.

The first inverse quantizer 1202 inversely quantizes the first hierarchy image 1201, and the resultant image is supplied to the adding circuit 1206. The first enlarging circuit 1204 enlarges the second hierarchy image 1203 to enlarge the resolution to the output image resolution, the second inverse quantizer 1205 inversely quantizes the resultant image, and the inversely quantized image is supplied to the adding circuit 1206. Similarly, the (n−1)th enlarging circuit enlarges the resolution of the n-th hierarchy image to the output image resolution, the n-th inverse quantizer inversely quantizes it and the inversely quantized image is supplied to the adding circuit 1206.

The m-th hierarchy image 1206 that is the final hierarchy is enlarged to the output image resolution by the (m−1)th enlarging circuit, and supplied to the adding circuit 1206. The adding circuit 1208 adds all the input data and generates a decoded image 1209.

The detailed example is described hereunder. The following is assumed herein.

The first hierarchy image is 4-bit data having the resolution of 600 dpi.

The second hierarchy image is 2-bit data having the resolution of 300 dpi.

The third hierarchy image is 2-bit data having the resolution of 200 dpi.

The first hierarchy image is shifted by 4 bits to the left (in the case where the quantization in which the inverse quantization is carried out by 4-bit shifting is carried out) to generate 8-bit image (data 1)the second hierarchy image is enlarged double, shifted by 2 bits to the left (in the case where the quantization in which the inverse quantization is carried out by 4 bit shifting is carried out), and is added with 0 to the upper 4 bits to generate an 8-bit image (data 2)the third hierarchy image is enlarged triple and added with 0 to the upper 6 bits to generate an 8-bit image (data 3)the data 1, the data 2, and the data 3 are added to generate the decoded image.

(Eighth Embodiment)

In the eighth embodiment, an example in which the code encoded by the encoding apparatus of the fourth embodiment or the fifth embodiment is decoded will be described. In the eighth embodiment, an example in which each hierarchy image is inversely quantized, the resolution is converted to the output resolution, and then the data is added will be described.

Figure 13:
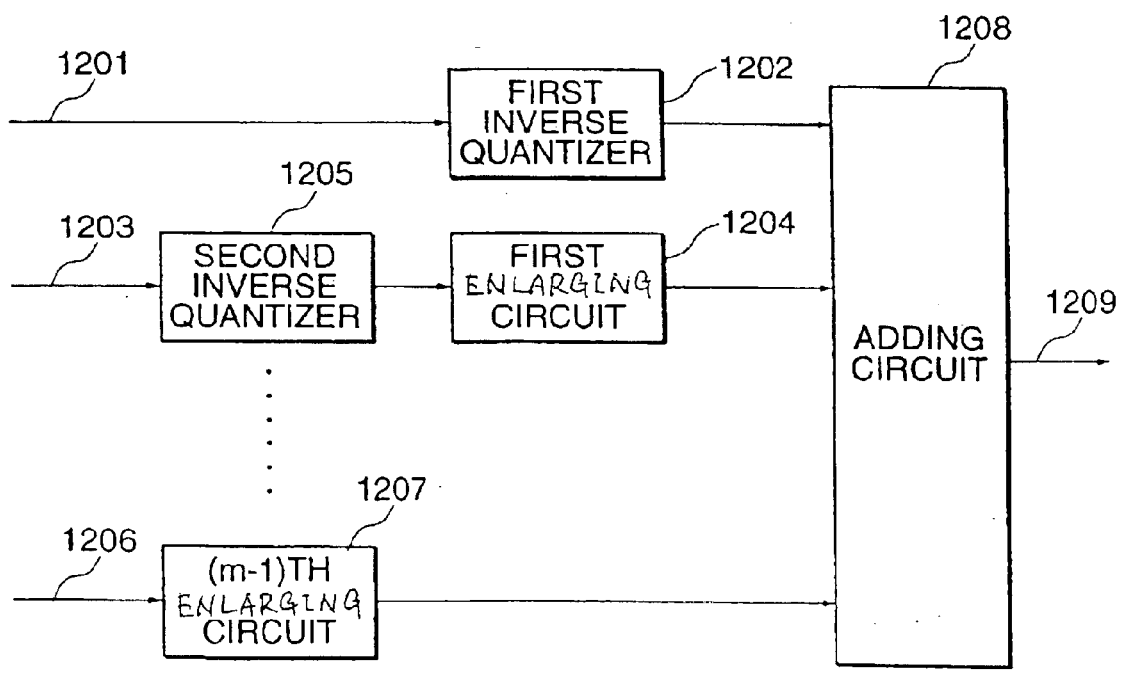
FIG. 13 is a structural diagram illustrating the eighth embodiment.

The image decoding apparatus of the eighth embodiment will be described with reference to FIG. 13. In FIG. 13, the characters are the same as those shown in FIG. 12. The operation will be described hereunder. The first hierarchy image 1201 is subjected to inverse quantization by the first inverse quantizer, and supplied to the adding circuit 1206.

The second hierarchy image 1203 is inversely quantized by the second inverse quantizer 1205, enlarged by the first enlarging circuit 1204 to the output image resolution, and supplied to the adding circuit 1206. Similarly, the n-th hierarchy image is inversely quantized by the n-th inverse quantizer, enlarged by the (n−1)th enlarging circuit to the output image resolution, and supplied to the adding circuit 1206.

The m-th hierarchy image 1206 that is the final hierarchy is enlarged by the (m−1)th enlarging circuit to the output image resolution, and supplied to the adding circuit 1206. The adding circuit 1208 adds all the input data to generate the decoded image 1209.

Furthermore, the detailed example will be described hereunder. The following is assumed.

The first hierarchy image is 4-bit data having the resolution of 600 dpi.

The second hierarchy image is 2-bit data having the resolution of 300 dpi.

The third hierarchy image is 2-bit data having the resolution of 200 dpi.

The first hierarchy image is shifted by 4 bits to the left (in the case where the quantization in which the inverse quantization is carried out by 4-bit shifting is carried out) to generate an 8-bit image (data 1)the second hierarchy image is shifted by 2 bits to the left (in the case where the quantization in which the inverse quantization is carried out by 4-bit shifting is carried out), is added with 0 to the upper 4 bits to generate an 8-bit image, and is enlarged double (data 2)the third hierarchy image is added with 0 to the upper 6 bits to generate an 8-bit image, and enlarged triple (data 3)the data 1, the data 2, and the data 3 are added to generate the decoded image.

(Ninth Embodiment)

In the ninth embodiment, an example in which the code encoded by the image encoding apparatus of the fourth embodiment or the fifth embodiment is decoded will be described. The ninth embodiment involves an exemplary decoding apparatus that adds with successive stepping up of the resolution from the final hierarchy image.

Figure 14:
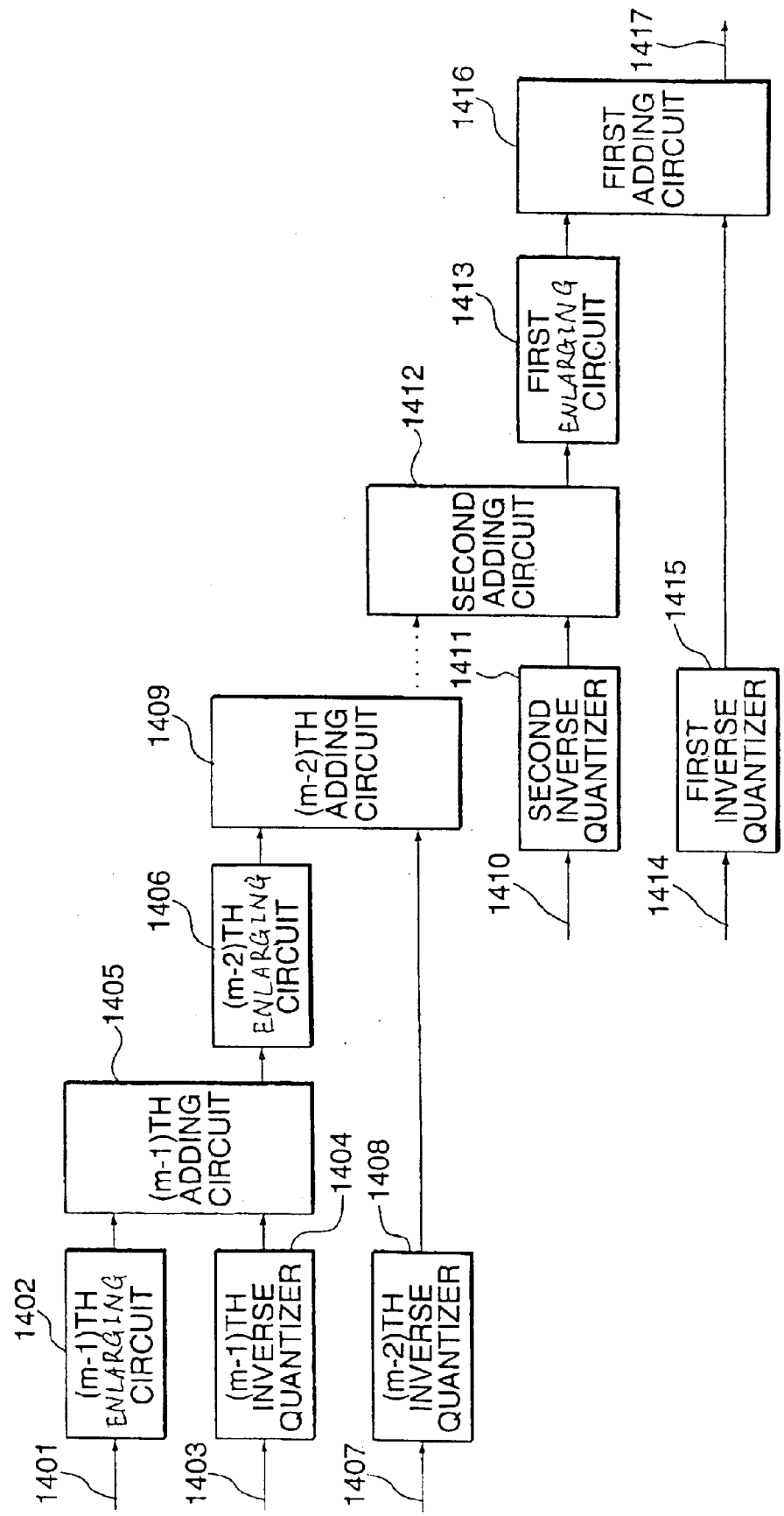
FIG. 14 is a structural diagram illustrating the ninth embodiment.

The ninth embodiment will be described with reference to FIG. 14. In FIG. 14, 1401 denotes an m-th hierarchy image, 1402 denotes an (m−1)th enlarging circuit, 1403 denotes an (m−1)th hierarchy image, 1404 denotes an (m−1)th inverse quantizer, 1405 denotes an (m−1)th adding circuit, 1406 denotes an (m−2)th enlarging circuit, 1407 denotes an (m−2)th hierarchy image, 1408 denotes an (m−2)th inverse quantizer, 1409 denotes an (m−2)th adding circuit, 1410 denotes a second hierarchy image, 1411 denotes a second inverse quantizer, 1412 denotes a second adding circuit, 1413 denotes a first enlarging circuit, 1414 denotes a first hierarchy image, 1415 denotes a first inverse quantizer, 1416 denotes a first adding circuit, and 1417 denotes a decoded image.

At first, the resolution of the m-th hierarchy image 1401 is enlarged to the resolution of the (m−1)th hierarchy image by the (m−1)th enlarging circuit 1402. The (n−1)th hierarchy image 1403 is inversely quantized by the (m−1)th inverse quantizer 1404.

The output of the (m−1)th enlarging circuit 1402 and the output of the (m−1)th inverse quantizer 1404 are added by the (m−1)th adding circuit 1405. The output resolution of the (m−1)th adding circuit 1405 is enlarged to the resolution of the (m−2)th hierarchy image by the (m−2)th enlarging circuit 1406.

The (m−2)th hierarchy image 1407 is inversely quantized by the (m−2)th inverse quantizer 1408. Furthermore, the output of the (m−2)th enlarging circuit 1406 and the output of the (m−2)th inverse quantizer 1408 are added by the (m−1)th adding circuit 1405. In the following, the results obtained by enlarging the added lower hierarchy (hierarchy having a larger number) and the result obtained by inversely quantizing the image of the next upper hierarchy (hierarchy having 1-smaller number) are successively added hierarchically.

Finally, the second hierarchy 1410 is inversely quantized by the second inverse quantizer 1411, and added to the output of the second enlarging circuit by the second adding circuit 1412. Furthermore, the output of the second adding circuit 1412 is enlarged to the resolution of the first hierarchy image, namely the resolution of the decoded image, by the first enlarging circuit 1413.

Furthermore, the first hierarchy image 1414 is inversely quantized by the first inverse quantizer 1415, and the output of the first enlarging circuit 1413 and the output of the first inverse quantizer 1415 are added by the first adding circuit 1416, and the decoded image 1417 is generated.

The detailed example will be described hereunder. The following is assumed.

The first hierarchy image is 4-bit data having the resolution of 600 dpi.

The second hierarchy image is 2-bit data having the resolution of 300 dpi.

The third hierarchy image is 2-bit data having the resolution of 200 dpi.

At first, the third hierarchy image is enlarged by a factor of 3/2 so that the resolution is 300 dpi (data 1)the second hierarchy image is inversely quantized. It is assumed that the inverse quantization has been quantized so as to be implemented by shifting by 2 bits to the left in this example. The inverse quantization result becomes 4-bit data having the resolution of 300 dpi (data 2).

The data 1 and the data 2 are added to generate 4-bit data (data 3)the data 3 is enlarged double so as to have the resolution of 600 dpi (data 4)the first hierarchy image is inversely quantized. It is assumed that the inverse quantization has been quantized so as to be implemented by shifting by 4 bits to the left in this example. The inverse quantization result becomes 8-bit data having the resolution of 600 dpi (data 5)the data 4 and the data 5 are added to generate 8-bit data of 600 dpi. This data is sent out as the decoded data.

(Tenth Embodiment)

In the tenth embodiment, an exemplary apparatus in which the input image is divided into bit plane for encoding and decoding will be described.

It is assumed that the input image resolution is 600dpi, the number of gradations is 256 (8 bits), and the input image is divided into the following three hierarchies.

4-bit information having the image resolution of 600 dpi.
6-bit information having the image resolution of 300 dpi.
8-bit information having the image resolution of 200 dpi.

The upper 4 bits of the input image is encoded without changing of the input image resolution during encoding (first hierarchy code)the next upper 2 bits of the input image is encoded with reduction of the input image to ½ (second hierarchy code)the lower 2 bits of the input image is encoded with reduction of the input image to ⅓ (third hierarchy code).

The first hierarchy code is decoded to obtain the first hierarchy image during decoding. The first hierarchy image is shifted by 4 bits to the left to generate an 8-bit image (data 1).

The second hierarchy code is decoded to obtain the second hierarchy image. The second hierarchy image is enlarged double, shifted by 2 bits to the left, and added with 0 to the upper 4 bits to generate an 8-bit image (data 2).

The third hierarchy code is decoded to obtain the third hierarchy image. The third hierarchy image is enlarged triple, and added with 0 to the upper 6 bits to generate an 8-bit image (data 3)the data 1, the data 3, and the data 3 are added to generate the decoded image.

In the abovementioned embodiments, as the method for enlarging and reduction, various methods such as the nearest neighbor method, bilinear method, and cubic convolution method may be employed.

(Eleventh Embodiment)

The eleventh embodiment is the detailed example of the ninth embodiment. Furthermore, the eleventh embodiment involves an image decoder for obtaining the image quality that is better than that obtained by the image decoder described in the first embodiment.

In the abovementioned first embodiment, the block strain can occur because the second hierarchy image is enlarged independently in the block. In the eleventh embodiment, because the second hierarchy image is enlarged by use of other block, the smooth decoded image having no block strain is generated.

Figure 21:
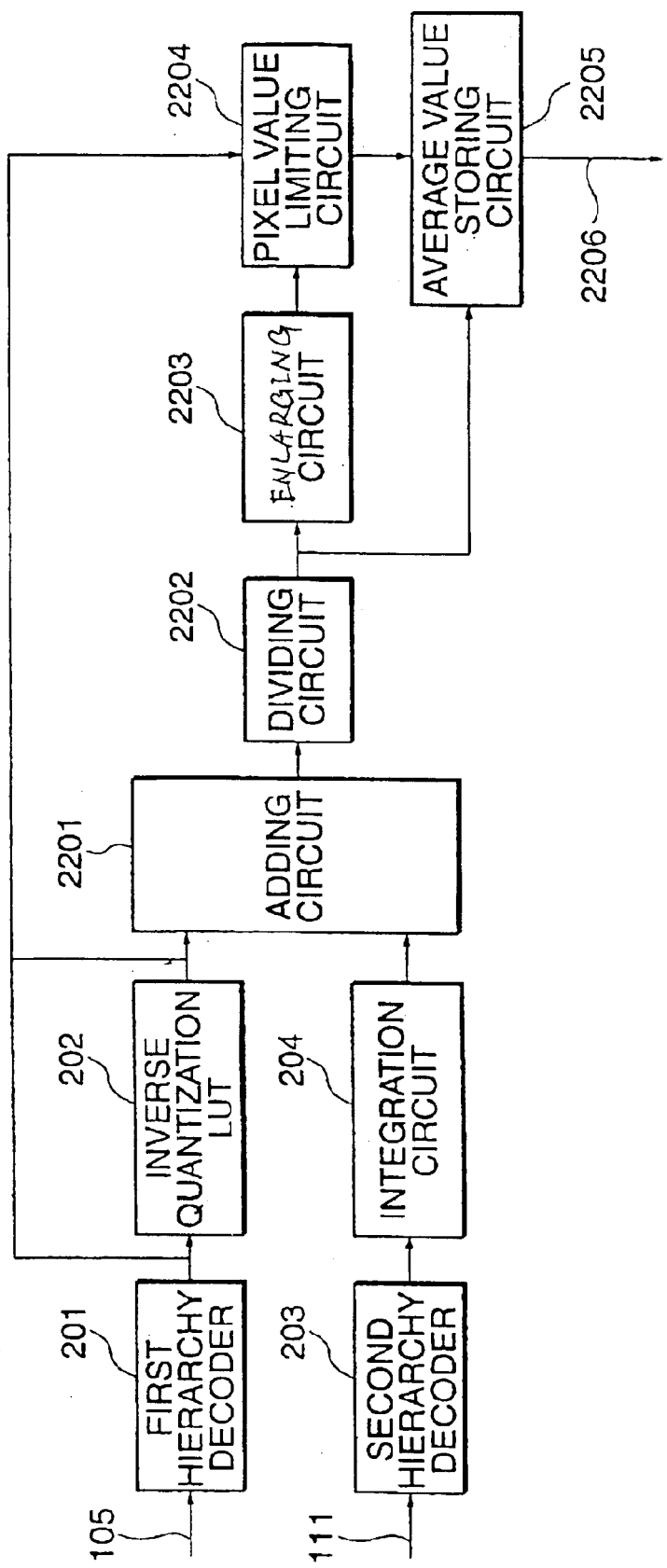
FIG. 21 is a structural diagram for illustrating the eleventh embodiment.

The eleventh embodiment will be described with reference to FIG. 21. In FIG. 21, 105 denotes a first hierarchy code, 111 denotes a second hierarchy code, 201 denotes a first hierarchy decoder, 202 denotes an inverse quantization LUT, 203 denotes a second hierarchy decoder, 204 denotes an integration circuit, 2201 denotes an adding circuit, 2202 denotes a dividing circuit, 2203 denotes an enlarging circuit, 2204 denotes a pixel value limiting circuit, 2205 denotes an average value storing circuit, and 2206 denotes a decoded image.

After the first hierarchy code 105 and the second hierarchy code 111 are supplied, the operation of the first hierarchy decoder 201, the inverse quantization LUT 202, the second hierarchy decoder 203, and the integration circuit 204 is the same as that described in the first embodiment.

The inverse quantization result obtained by the inverse quantization LUT 202 and the integration result obtained by the integration circuit 204 are supplied to the adding circuit 2201. Herein, the inverse quantization result is denoted by $X(i)$, and the integration result is denoted by Y (wherein $i=0, 1, 2, \ldots, 8$).

The adding circuit 2201 calculates as described hereunder.

$$Z=SX(i)+Y$$

The dividing circuit 2202 calculates as described hereunder.

$$z=Z/9$$

z obtained as the result of the calculation is the pixel value having the resolution of 200dpi, and z is corresponding to the average value of the 3×3 blocks. The enlarging circuit 2203 enlarges the value obtained by the dividing circuit. In other words, the image of 200 dpi is enlarged triple. As the method for enlarging, various methods such as the nearest neighbor method, bilinear method, and cubic convolution method may be employed.

The image can be outside the pixel value variation permission range shown in the first embodiment after enlarging of the image. As shown in the first embodiment, the pixel value variation permission range is obtained from the first hierarchy image by use of LUT.

The pixel value limiting circuit 2204 limits the enlarged pixel value within the pixel value variation permission range. The same limiting method as used in the first embodiment may be used herein. Furthermore, the output of the pixel value limiting circuit 2204 and the average value that is the output of the dividing circuit 2202 are supplied to the average value storing circuit 2205, and the average value in the block is stored.

Herein, the output of the pixel value limiting circuit 2204 is denoted by A(i), and the output of the dividing circuit 2202 is denoted by z.

The error sum from the average value is denoted by E. E is calculated by use of the following equation.

$$E = Z \times 9 - A(i)$$

The average value is stored according to the following sequence. Herein, int( ) is a function for omission of fractions under decimal point of the input value, and dec( ) is a function for indicating the fractions under decimal point of the input value.

(1) E is substituted for SUM.
(2) If E=0, then end.
If E>0, then
   if dec(E/9)=0, then e=(E/9)
   if dec(E/9)≠0, then e=int(E/9)+1
If E<0, then
   if dec(E/9)=0, then e=(E/9)
   if dec(E/9)≠0, then e−int(E/9)−1
(3) i=0
(4) e is added to A(i). Herein, the addition is limited within the pixel value variation permission range. The incremental pixel value that has been added actually is denoted by e'.
(5) e' is subtracted from E
(6) If E=0, then end
   If SUM*E<0, then go to (8)
   If i=8, then go to (8)
   If other than the above, 1 is added to i, and go to (7)
(7) If the absolute value of e is larger than the absolute value of E, then E is substituted for e, and to go (4).
(8) i=0
(9) E is added to A(i). Herein, the addition is limited within the pixel value variation permission range. The incremental pixel value that has been added actually is denoted by e'.
(10) e' is subtracted from E.
(11) If E=0, then end.
   if i=8, then end.
   if cases other than the above, 1 is added to i, and go to (9).

(Twelfth Embodiment)

In the twelfth embodiment, the edge is detected in the pixel value limiting circuit 2204, and if an edge is found, then the pixel value limitation result is regarded as the quantization representative value in addition to the eleventh embodiment.

In the pixel value limiting circuit 2204 shown in FIG. 21, the differential between the enlarging circuit 2203 and the quantization representative value is calculated, and if the absolute value of the differential is equal to or larger than a predetermined value, then the pixel is judged to be an edge pixel, and the output of the pixel value limiting circuit 2204 is used as the quantization representative value (condition 1).

If other than (condition 1) and inside the pixel value variation permission range, then the enlarging value is sent out as it is.

If other than (condition 1) and outside the pixel value variation permission range, then a value that is included in the pixel value variation permission range and that changes the pixel value by a minimized value from the enlarging value is sent out.

The abovementioned predetermined value (edge threshold value) can be dependent on the first hierarchy image, namely the quantization index. For example, it is implemented by use of LUT in which the quantization index is the input and the edge threshold value is the output. Otherwise, it may be multiple of a constant of the pixel value variation permission range.

As described hereinabove, the following effect is obtained according to the present invention. Input image data is divided into first image data (an image data having a minimized resolution that is capable of expressing all the perceptible gradations) and second image data (image data having a minimized number of gradations that is capable of expressing all the perceptible edge positions) and then encodes these image data to thereby implement the resolution and the number of gradations required for expressing the image with a minimized data quantity.

In the case where the gradation level represents the edge position in one pixel, the image data having a minimized number of gradations that is capable of expressing all the perceptible edge positions is held, and as the result it is possible to guarantee the edge position.

The entire disclosure of Japanese Patent Application No. 2000-71598 filed on Mar. 15, 2000 including specification, claims, drawings and abstract is incorporated herein by reference in its entirety.

What is claimed is:

1. An image encoding apparatus, comprising:
   a blocking unit that divides an input image into blocks;
   a quantization unit that quantizes pixel values of the image in a block divided by the blocking unit;
   a quantization representative value obtaining unit that obtains a quantization representative value for each of the pixel values of the image quantized by the quantization unit;
   an average value obtaining unit that obtains an average value in a block of differential between each of the pixel values in the block and its corresponding quantization representative value obtained by the quantization representative value obtaining unit;
   a first hierarchy encoding unit that encodes the image quantized by the quantization unit; and
   a second hierarchy encoding unit that encodes the average value obtained by the average value obtaining unit.

2. The image encoding apparatus according to claim 1, wherein the average value obtaining unit comprises:
   a differential calculation unit that calculates the differential between each of the pixel values in the block and its corresnonding quantization representative value obtained by the quantization representative value obtaining unit for every pixel;
   an adding unit that adds the differential calculated by the differential calculation unit in the block to obtain differential sum; and
   a dividing unit that divides the differential sum added by the adding unit by a predetermined number.

3. The image encoding apparatus according to claim 2, wherein the predetermined number used in the dividing unit is the number of pixels in the block.

4. The image encoding apparatus according to claim 2, wherein the predetermined number used in the dividing unit is a number expressed by a power of 2, and
   the dividing unit is implemented by bit shifting.

5. The image encoding apparatus according to claim 2, wherein the predetermined number used in the dividing unit is set so that the dynamic range of the differential sum added by the adding unit is divided to give a predetermined value.

6. The image encoding apparatus according to claim 2, wherein the differential calculation unit comprises a lookup table, and the lookup table receives the pixel value in the block as an input and outputs the differential between the pixel value in the block and the quantization representative value.

7. An image decoding apparatus that decodes a code encoded by the image encoding apparatus according to claim 1, the image decoding apparatus comprising:

- a first hierarchy decoding unit that decodes a code encoded by the first hierarchy encoding unit to obtain data;
- a second hierarchy decoding unit that decodes a code encoded by the second hierarchy encoding unit to obtain second hierarchy data;
- an inversely quantization unit that inversely quantizes the data decoded by the first hierarchy decoding unit to obtain first hierarchy data;
- a pixel value correction unit that corrects the first hierarchy data inversely quantized by the inverse quantization unit by use of the second hierarchy data decoded by the second hierarchy decoding unit to obtain the image data in the block; and
- an inverse blocking unit that raster-scans the image data in the block obtained by the pixel value correction unit.

8. The image decoding apparatus according to claim 7, wherein the predetermined number used in the dividing unit when encoding is the number of pixels in the block; and the pixel value correction unit adds the second hierarchy data decoded by the second hierarchy decoding unit as it is to the first hierarchy data of each pixel in the block.

9. The image decoding apparatus according to claim 7, further comprising:

a differential average value calculation unit that calculates the average value of the differential in the block, wherein the pixel value correction unit adds the differential average value obtained by the differential average value calculation unit to the first hierarchy data of each pixel in the block.

10. The image decoding apparatus according to claim 7, further comprising:

a pixel value variation permission range obtaining unit that obtains a pixel value variation permission range of the data decoded by the first hierarchy decoding unit, wherein the pixel value correction unit controls the pixel value added to each pixel in the block so as to be included within the pixel value variation permission range.

11. The image decoding apparatus according to claim 10, wherein the pixel value variation permission range obtaining unit is implemented by a lookup table that receives the quantization index obtained by the first hierarchy decoding unit as an input and generates the pixel value variation permission range of the positive side and the negative side as the output.

12. The image decoding apparatus according to claim 10, wherein the pixel value correction unit calculates the differential sum between the second hierarchy data and the first hierarchy data, predetermines an order of addition for adding the differential sum to the pixel value in the block, successively adds the differential sum according to the predetermined order so as to be included in the pixel value variation permission range, and terminates the addition when the differential sum becomes zero.

13. The image decoding apparatus according to claim 10, further comprising:

a differential average value calculation unit that calculates an average value of the differential in the block or a value similar to the average value, wherein the pixel value correction unit first adds the average value calculated by the differential average value calculation unit for every pixel within the pixel value variation permission range; and the added pixel value is subtracted from the differential sum, and in the case where the differential sum is not zero, an addition order for adding the differential sum to the pixel value in the block is predetermined in advance, the differential sum is successively added according to the predetermined order so as to be included in the pixel value variation permission range, and the addition is terminated at the time point when the differential sum becomes zero.

14. The image decoding apparatus according to claim 7, further comprising:

an average obtaining unit that obtains the image data average value of pixel values in a block between the first hierarchy data inversely quantized by the inverse quantization unit and the second hierarchy data decoded by the second hierarchy decoding unit; and an enlarging unit that enlarges the average value obtained by the average value obtaining unit to the resolution of an output image.

15. The image decoding apparatus according to claim 14, further comprising:

a comparison unit that compares a pixel value obtained by the enlarging unit with a pixel value of the first hierarchy data, wherein, when the absolute value of the differential between a pixel value obtained by the enlarging unit and the pixel value ot the first hierarchy data is larger than a predetermined value, the pixel value correction unit does not perform.

* * * * *